US009606561B2

United States Patent
Noda et al.

(10) Patent No.: US 9,606,561 B2
(45) Date of Patent: Mar. 28, 2017

(54) OPERATION PLANNING SYSTEM

(71) Applicant: Kabushiki Kaisha Toshiba, Tokyo (JP)

(72) Inventors: Hideki Noda, Saku (JP); Reiko Obara, Kawasaki (JP); Takenori Kobayashi, Meguro-ku (JP); Genki Kiya, Nerima-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 437 days.

(21) Appl. No.: 14/375,282

(22) PCT Filed: Nov. 22, 2012

(86) PCT No.: PCT/JP2012/080333
§ 371 (c)(1),
(2) Date: Jul. 29, 2014

(87) PCT Pub. No.: WO2013/114712
PCT Pub. Date: Aug. 8, 2013

(65) Prior Publication Data
US 2015/0019035 A1 Jan. 15, 2015

(30) Foreign Application Priority Data
Jan. 30, 2012 (JP) .................................. 2012-017315

(51) Int. Cl.
*G05D 3/12* (2006.01)
*G05F 1/66* (2006.01)
(Continued)

(52) U.S. Cl.
CPC .............. *G05F 1/66* (2013.01); *G05B 15/02* (2013.01); *G06Q 50/06* (2013.01); *H02J 3/32* (2013.01);
(Continued)

(58) Field of Classification Search
CPC .................................. G05F 1/66; G05B 15/02
(Continued)

(56) References Cited

U.S. PATENT DOCUMENTS 4,125,782 A * 11/1978 Pollnow, Jr. .............. H02J 3/14
307/34
6,865,450 B2 * 3/2005 Masticola .............. G06Q 10/06
700/291

(Continued)

FOREIGN PATENT DOCUMENTS

CN 1673910 A 9/2005
CN 101960396 A 1/2011
(Continued)

OTHER PUBLICATIONS

Li, Na, Lijun Chen, and Steven H. Low. "Optimal demand response based on utility maximization in power networks." 2011 IEEE power and energy society general meeting. IEEE, 2011.pp. 1-8.*
(Continued)

*Primary Examiner* — Satish Rampuria
(74) *Attorney, Agent, or Firm* — Oblon, McClelland, Maier & Neustadt, L.L.P.

(57) ABSTRACT

In formulating of a power generation operation schedule to a power grid network including multiple power plants and transformer stations, and, multiple batteries installed in association therewith, an operation planning system stores in advance power generation basic unit information of the power plant, and derivation information of the stored energy in the battery. Power generation basic unit information of the battery where power generation basic unit of the stored energy is added is set based on the power generation basic unit information of the power plant and the derivation information of the stored energy. While selecting a power generation facility from the power plants and the batteries in an order of a smaller value indicated by the power genera-
(Continued)

tion basic unit information, the power generation quantity of the selected power generation facility is added to a total power generation quantity until the total power generation quantity matches a demand quantity.

12 Claims, 19 Drawing Sheets

(51) Int. Cl.
*G06Q 50/06* (2012.01)
*H02J 3/32* (2006.01)
*H02J 3/46* (2006.01)
*H02J 3/38* (2006.01)
*G05B 15/02* (2006.01)
*H02J 3/00* (2006.01)

(52) U.S. Cl.
CPC *H02J 3/38* (2013.01); *H02J 3/46* (2013.01); *H02J 3/383* (2013.01); *H02J 3/386* (2013.01); *H02J 2003/003* (2013.01); *H02J 2003/007* (2013.01); *Y02E 10/563* (2013.01); *Y02E 10/566* (2013.01); *Y02E 10/763* (2013.01); *Y02E 60/76* (2013.01); *Y02E 70/30* (2013.01); *Y04S 10/54* (2013.01); *Y04S 40/22* (2013.01)

(58) Field of Classification Search
USPC .................................................. 700/286–298
See application file for complete search history.

(56) References Cited

U.S. PATENT DOCUMENTS

| | | | |
|---|---|---|---|
| 7,020,893 B2* | 3/2006 | Connelly | ............... H04H 60/06 348/E7.071 |
| 7,206,644 B2 | 4/2007 | Iino et al. | |
| 8,577,511 B2 | 11/2013 | Ohara et al. | |
| 8,626,351 B2 | 1/2014 | Hirato et al. | |
| 8,862,282 B2 | 10/2014 | Ohara et al. | |
| 2005/0246039 A1 | 11/2005 | Iino et al. | |
| 2011/0087381 A1 | 4/2011 | Hirato et al. | |
| 2011/0144921 A1 | 6/2011 | Ishibashi | |
| 2011/0159389 A1 | 6/2011 | Ohara et al. | |
| 2011/0231028 A1* | 9/2011 | Ozog | ..................... G06Q 10/06 700/291 |
| 2012/0253567 A1* | 10/2012 | Levy | ................... B60L 11/1844 701/22 |
| 2013/0096725 A1 | 4/2013 | Ishida et al. | |
| 2013/0304274 A1 | 11/2013 | Ohara et al. | |

FOREIGN PATENT DOCUMENTS

| | | |
|---|---|---|
| CN | 102149983 A | 8/2011 |
| JP | 2001 037085 | 2/2001 |
| JP | 2006 094649 | 4/2006 |
| JP | 2006 262567 | 9/2006 |
| JP | 2009 240080 | 10/2009 |
| JP | 2010 134964 | 6/2010 |
| WO | 2012 002001 | 1/2012 |

OTHER PUBLICATIONS

Nutaro, James, et al. "Integrated hybrid-simulation of electric power and communications systems." Power Engineering Society General Meeting, 2007. IEEE. IEEE, 2007. pp. 1-8.*
Darabi, Zahra, and Mehdi Ferdowsi. "Aggregated impact of plug-in hybrid electric vehicles on electricity demand profile." IEEE Transactions on Sustainable Energy 2.4 (2011): pp. 501-508.*
Extended European Search Report issued Nov. 5, 2015 in Patent Application No. 12867506.3.
International Search Report Issued Feb. 26, 2014 in PCT/JP12/080333 filed Nov. 22, 2012.
Combined Chinese Office Action and Search Report issued Dec. 2, 2015 in Patent Application No. 201280067831.X (with English language translation and English translation of categories of cited documents) .

* cited by examiner

```
<POWER GENERATION FACILITY SELECTING LIST>
  1) CLOCK TIME:
     YEAR, MONTH, DAY, HOUR, MINUTE - HOUR, MINUTE
  2) OPERATED FACILITY:
     (SMALLER BASIC UNIT ORDER)
  1. GEOTHERMAL POWER GENERATION PLANT A, NOy.:xMWh
  2. BATTERY P1:xMWh
  3. BATTERY H1:xMWh
       .
       .
 50. BATTERY H55: xMWh
 51. PV POWER GENERATION 1 + BATTERY P1:xMWh
 52. WIND POWER GENERATION 1 + BATTERY F1:xMWh
 53. POWER GENERATION PLANT B,
     NOy. DIESEL POWER GENERATION:xMWh
```

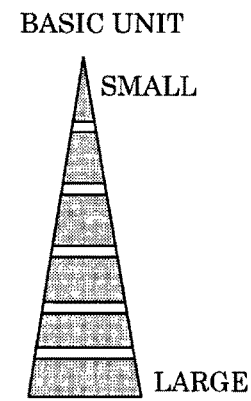

BASIC UNIT
SMALL
LARGE

*FIG. 6*

OPERATION PLANNING SYSTEM

TECHNICAL FIELD

Embodiments of the present disclosure relate to an operation planning system that predicts a power demand to create operation schedules of various power sources.

BACKGROUND ART

In recent years, constraints in a power system in view of environments, such as an environmental-load-substance emission limit represented by a $CO_2$ emission quantity, and an imposition in accordance with an emission quantity, are becoming further important considerations in accordance with a cost increase of fuels and an interest in an environment. Hence, a scheme like a peak-shift that generates power in a time slot at which the $CO_2$ emission quantity is little to store the generated energy in batteries is getting a high degree of expectation. Therefore, technical development is advancing from the stand point of effective operation of batteries disposed in a power system as much as possible.

For example, a technology is proposed which models a power plant and a battery, calculates an evaluation score of an operation schedule using such models in an evaluation function, and looks up an operation schedule that optimizes the evaluation score (see, for example, Patent Document 1).

In addition, an environment contribution that enables a reduction of $CO_2$ by accumulating midnight power, and utilizing such power in a daytime to equalize a load, and environmental contribution that contributes to a load equalization in a large-scale power generation facility by performing a self-consumption on power generated by a small-scale power generation facility are evaluated, and such evaluations are distributed to promote an installation of battery facilities and battery facilities provided with power generation facilities (see, for example, Patent Document 2).

CITATION LIST

Patent Literatures

Patent Document 1: JP 2009-240080 A
Patent Document 2: JP 2010-134964 A

SUMMARY

Technical Problem

The proposed technologies so far are, however, not based on a consideration on the environmental effect of batteries, and it is difficult to precisely know how much a contribution to the reduction of an environmental load is attained. Hence, when planning an operation schedule, it is necessary to select a power facility to be operated in consideration of various factors, but it is not always true that the best selection to optimize the environmental load is enabled. In addition, it is expected that batteries are installed in association with various power facilities in future, and thus the effect of the batteries to the environment becomes completely different depending on how the batteries are associated.

Embodiments of the present disclosure have been made to address the aforementioned technical problems, and it is an objective of the present disclosure to provide an operation planning system that can plan an operation schedule in consideration of an environmental effect given by energy generation stored in batteries (hereinafter, referred to as "power generation by batteries").

Solution to Problem

To accomplish the above objective, an operation planning system according to an embodiment is an operation planning system which plans a power generation operation schedule to a power grid network that interconnects multiple power plants, multiple transformer stations (TR-station), and multiple batteries installed in association therewith through a power system, and which includes: a condition determiner which sets a condition of an operation schedule, and which receives power demand quantity information in accordance with the setting; a database that stores in advance power generation basic unit information of the power plant, and derivation information of stored energy in the battery; a basic unit determiner that determines power generation basic unit information of the battery to which the power generation basic unit of the stored energy is added based on the power generation basic unit information of the power plant and the derivation information of the stored energy; and an adder that adds, while selecting a power generation facility from the power plants and the batteries in an order of a smaller value indicated by the power generation basic unit information, the power generation quantity of the selected power generation facility to a total power generation quantity until the total generation quantity matches a demand quantity. The operation planning system creates an operation schedule that presents the power generation facility in accordance with the demand quantity and each power generation quantity thereof.

The derivation information may be application information indicating an application of the battery. In this case, the application information on the battery installed in association with the power plant may indicate an application for a fluctuation suppression, and when the application information indicates the application for a fluctuation suppression, the basic unit determiner may add the power generation basic unit information of the power plant where the battery is installed to the power generation basic unit information of the battery associated with the application information. In addition, the application information on the battery installed in association with the transformer station may indicate an application for a load equalization, and when the application information indicates the application for a load equalization, the basic unit determiner may add an average value of numeric values indicated by the power generation basic unit information of the respective power plants in the power grid network to the power generation basic unit information of the battery associated with the application information.

BRIEF DESCRIPTION OF DRAWINGS

FIG. 6 is an exemplary diagram illustrating a list of power generation facilities;

DESCRIPTION OF EMBODIMENTS

Several embodiments of an operation planning system and an operation schedule creating method thereof will be explained below in detail with reference to the accompanying drawings.

(First Embodiment)
(Configuration)

Figure 1:
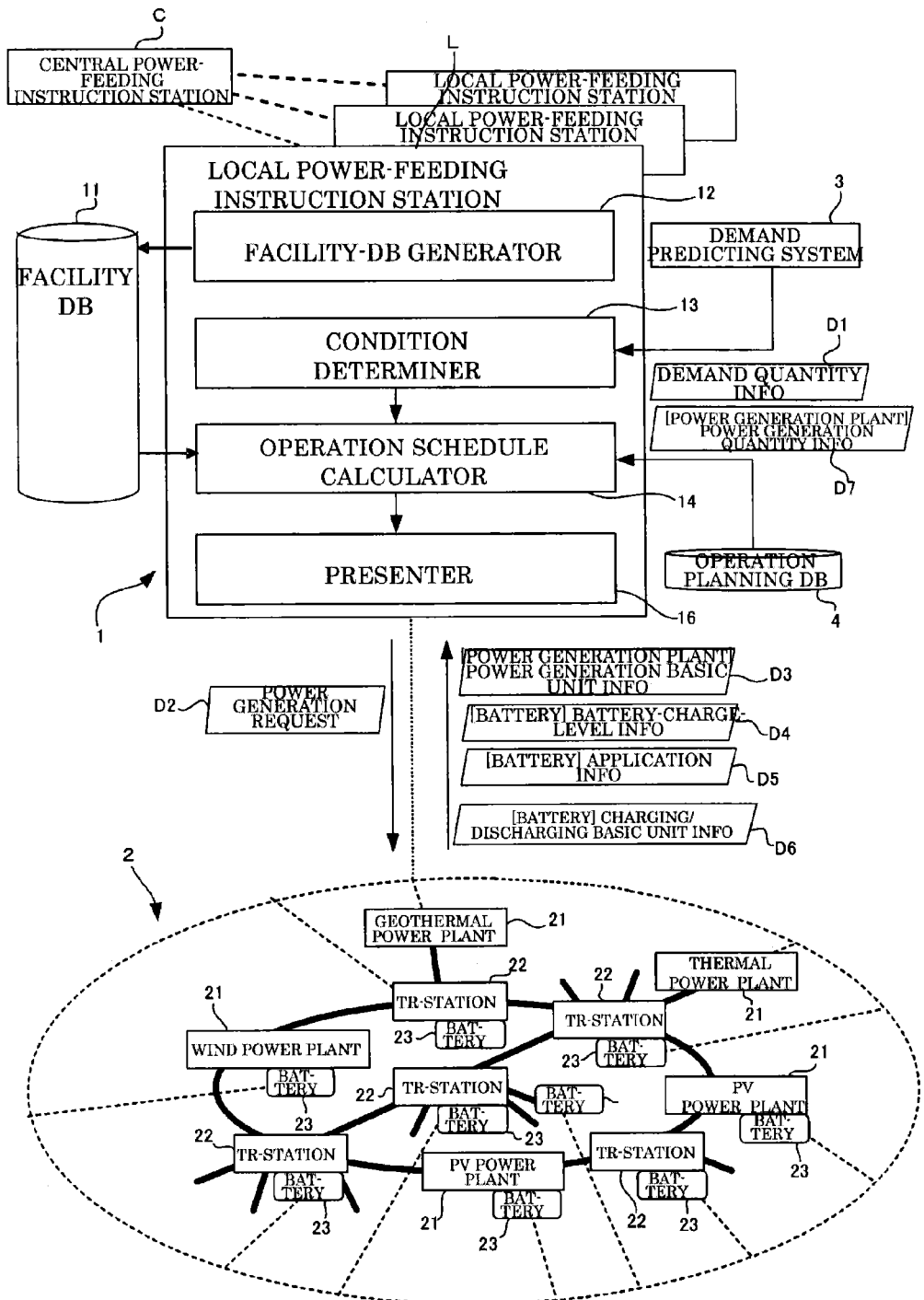
FIG. 1 is a block diagram illustrating a configuration of an operation planning system and that of a power grid network according to a first embodiment.

FIG. 1 is a block diagram illustrating a configuration of an operation planning system 1 and that of a power grid network 2 according to a first embodiment. The operation planning system 1 illustrated in FIG. 1 is installed in a power-feeding instruction station L in each area, and creates operation schedules of power plants 21 in other areas covered by the power grid network 2. The local power-feeding instruction station L is connected to a central power-feeding instruction station C through a communication network.

The power grid network 2 includes various power plants 21, such as natural energy power generation that converts natural energy into power, and thermal power generation, transformer stations 22 that relay power while performing transformation of power in the system, and a power system that connects those power plants 21 with the transformer stations 22. Example natural energy power generations are solar (PV) power generation, wind power generation, and geothermal power generation.

Each facility in the power grid network 2 is provided with a battery 23. The battery 23 for the power plant 21 is mainly utilized for the purpose of fluctuation suppression, and the battery 23 for the transformer station 22 is mainly utilized for the purpose of load equalization. Those batteries 23 are also utilized as a power generation facility.

The operation planning system 1 is a solo computer or distributed computers, causes a processor to execute a process in accordance with a program stored in advance to create an operation schedule from various pieces of data like demand quantity information D1, and outputs a power generation request D2. In creating the operating schedule, a power generation facility is selected and each power generation quantity is determined so as to meet a demand prediction while in consideration of an environmental load by power generation. As to the environmental load, it can be expressed as an emission quantity of an environmental load substance, and can be expressed as, for example, a $CO_2$ emission quantity. It may be other quantities, such as an NOx emission quantity, an SOx emission quantity, and dioxin emission quantity.

When, in particular, the energy of the battery 23 is utilized for power generation, the operation planning system 1 identifies the derivation of such energy, i.e., specifies the power plant 21 that primitively generated such energy, and considers the environmental load caused to generate such energy to select the battery 23 and determine the discharging quantity to minimize the environmental load.

This operation planning system 1 includes a facility DB 11, a facility-DB generator 12, a condition determiner 13, an operation schedule calculator 14, and a presenter 16. In addition, the operation planning system 1 is connected with the power grid network 2, a demand predicting system 3, and an operation planning DB 4 through a communication network so as to be capable of exchanging data therewith.

Figure 2:
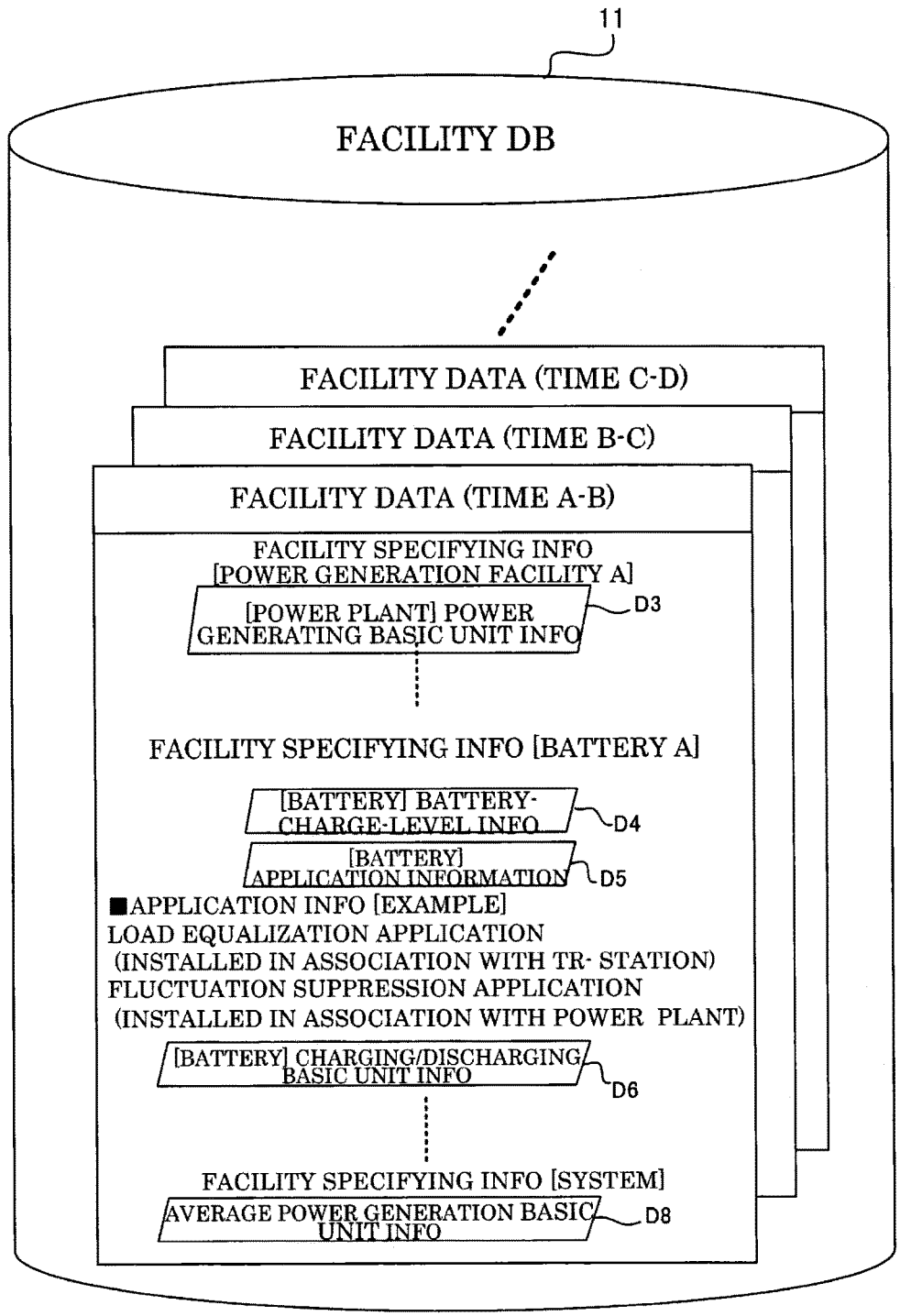
FIG. 2 is an exemplary diagram illustrating a facility DB according to the first embodiment.

The facility-DB generator 12 generates the facility DB 11. The facility DB 11 is a database related to each power generation facility in the power grid network 2. As illustrated in FIG. 2, the facility DB 11 stores power generation basic unit information D3 of the power plant 21 for each time slot. The power generation basic unit information D3 is numeric data indicating an environmental load per a unit power quantity, and is, for example, a $CO_2$ emission quantity per 1 MWh.

In addition, the facility DB 11 stores, as information related to the battery 23 for each time slot, battery-charge-level information D4, charging/discharging basic unit information D6, application information D5, and average power generation basic unit information D8. The battery-charge-level information D4 is numeric data indicating the remaining energy level of the battery 23 as a charge level SOC (State Of Charge). The charging/discharging basic unit information D6 is numeric data that converts energy lost at the time of charging/discharging into an environmental load. The application information D5 is data indicating an application of the battery 23. The application information D5 for the battery 23 installed in the power plant 21 in association therewith indicates a fluctuation suppression application, while the application information D5 for the battery 23 installed in the transformer station 22 in association therewith indicates a load equalization application. The average power generation basic unit information D8 is numeric data averaging the power generation basic unit of all power plants 21 in the power grid network 2.

The facility-DB generator 12 receives the power generation basic unit information D3, the battery-charge-level information D4, the application information D5, and the charging/discharging basic unit information D6 for each power generation facility from the power grid network 2 through the communication network, and stores those pieces of information in the facility DB 11. Additionally, the facility-DB generator 12 may be provided with man-machine interfaces, such as a keyboard, a mouse, a touch panel, and a display, may accept an inputting by a user, and may store the input information in the facility DB 11.

Moreover, the facility-DB generator 12 performs a calculation of averaging the power generation basic units of the respective power generation facilities to calculate a numeric value indicated by the average power generation basic unit information D8. An example averaging scheme is a clean development mechanism (CDM) scheme by the KYOTO mechanism. The average power generation basic unit information may be directly input through the man-machine interfaces.

The condition determiner 13 decides a total power generation quantity in accordance with a demand. This condition determiner 13 includes man-machine interfaces, and when the user specifies date and time, receives the demand quantity information D1 of the specified date and time from the demand predicting system through the communication network.

Figure 3:
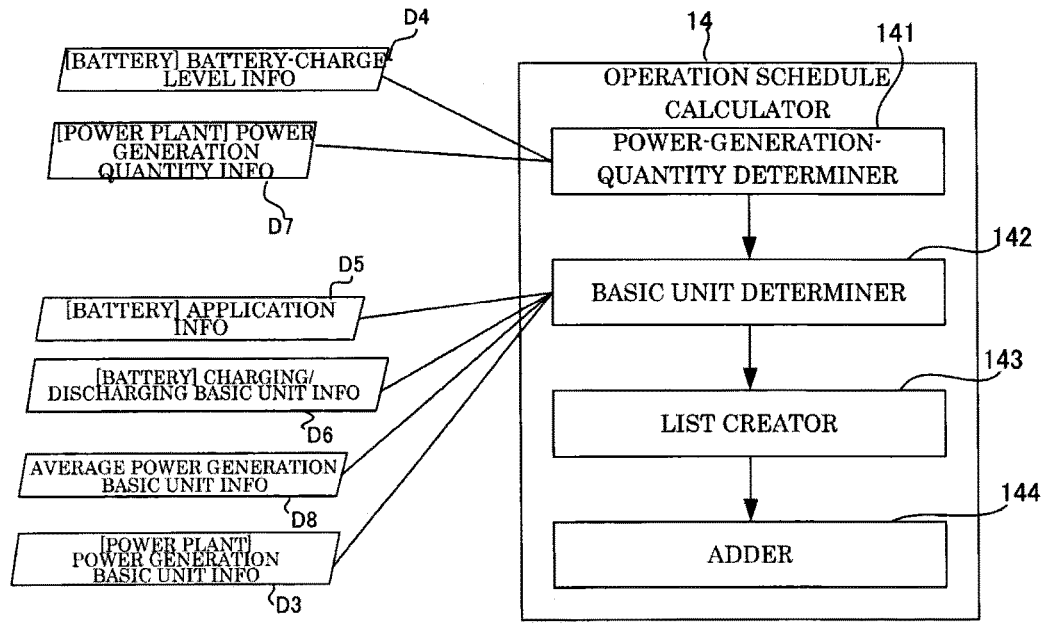
FIG. 3 is a block diagram illustrating a detailed configuration of an operation schedule calculator according to the first embodiment.

The operation schedule calculator 14 calculates an operation schedule matching the demand quantity information D1 in consideration of an environmental load. FIG. 3 is a block diagram illustrating a detailed configuration of the operation schedule calculator 14. As illustrated in FIG. 3, the operation schedule calculator 14 includes a power-generation-quantity determiner 141, a basic unit determiner 142, a list creator 143, and an adder 144.

The power-generation-quantity determiner 141 decides the power generation quantity by each power generation facility. The power generation quantity of the power plant 21 is determined upon reception of the power-generation-quantity information D7. The power-generation-quantity determiner 141 receives the power-generation-quantity information D7 of each power generation facility that can generate power from the operation planning DB 4 and the facility DB 11 through the communication network.

The power-generation-quantity information other than the battery 23 is received from the operation planning DB 4, and the power-generation-quantity information on the battery 23 is received from the facility DB 11. The power-generation-quantity information on the battery 23 is the battery-charge-level information D4 stored in the facility DB 11. That is, the power-generation-quantity determiner 141 receives, as the power-generation-quantity information, the battery-charge-level information D4 on each battery 23 from the facility DB 11.

Whether or not power can be generated is determined based on information stored in the operation planning DB 4 an the facility DB 11. In the operation planning DB 4, power-generator actual-accomplishment information, power-generator constraint information, and weather information are stored in association with information to specify a power generation facility. The power-generator actual-accomplishment information contains power-generation-quantity information for each time slot and for each weather. The power-generator constraint information contains information on the number of activation/deactivation, reserved capacity, and a tracking limit, etc. The power-generation-quantity determiner 141 determines whether or not power can be generated based on those pieces of information. When, for example, the power-generation-quantity information associated with the same weather as the weather information is zero, the power generation quantity of the corresponding power generation facility is determined as zero, or is determined as being unable to generate power.

The basic unit determiner 142 decides a basic unit of an environmental load of each power generation facility. The basic unit associated with the power plant 21 is determined upon reception of the power generation basic unit information D3 from the facility DB 11. The power generation basic unit determiner 142 receives the power generation basic unit information D3 on the power plant 21 from the facility DB 11 through a communication network.

When the basic unit of the battery 23 is determined, the basic unit determiner 142 specifies the power generation basic unit of the battery 23, obtains the charging/discharging basic unit information D6 from the facility DB 11, and adds the power generation basic unit with the charging/discharging basic unit information D6, and sets the addition result as the basic unit of the battery 23.

Figure 4:
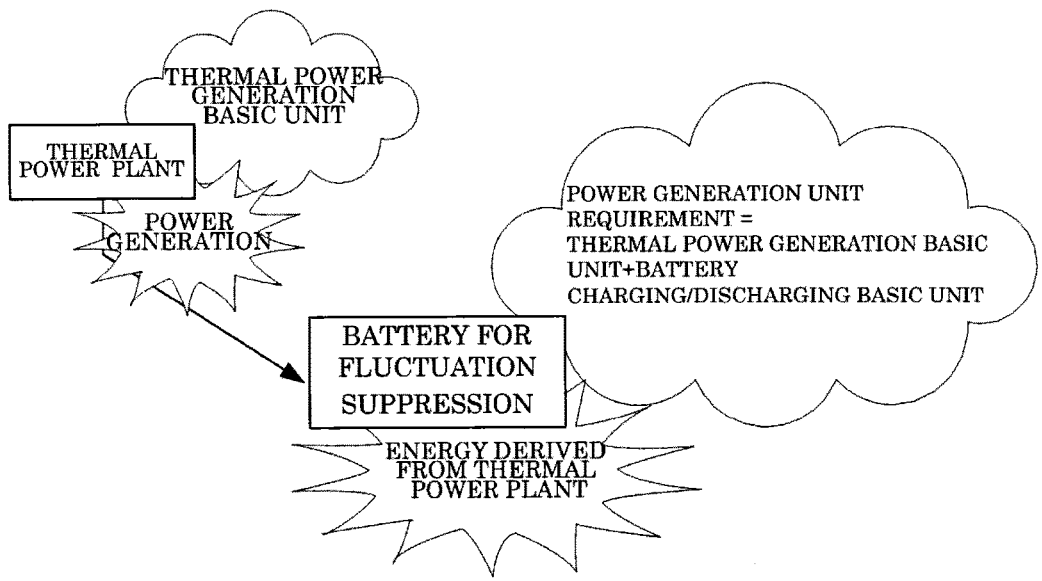
FIG. 4 is an exemplary diagram illustrating a power generation basic unit of batteries installed in a power plant in association therewith.

The power generation basic unit of the battery 23 is a basic unit having an increase of the environmental effect due to charging/discharging of the battery energy considered, and can be deemed as an environmental load caused to primitively generate energy stored in the battery 23. FIG. 4 is an exemplary diagram indicating a power generation basic unit of the battery 23 installed in the power plant 21 in association therewith, and FIG. 5 is an exemplary diagram indicating a power generation basic unit of the battery 23 installed in the transformer station 22 in association therewith.

As illustrated in FIG. 4, the derivation of the energy stored in the battery 23 installed in the power plant 21 for the purpose of an output fluctuation suppression is the power plant 21 where the battery 23 belongs. Hence, the power generation basic unit of the battery 23 installed for the purpose of an output fluctuation suppression can be obtained by adding the battery charging/discharging basic unit to the basic unit of the power plant 21 where the battery 23 belongs.

Figure 5:
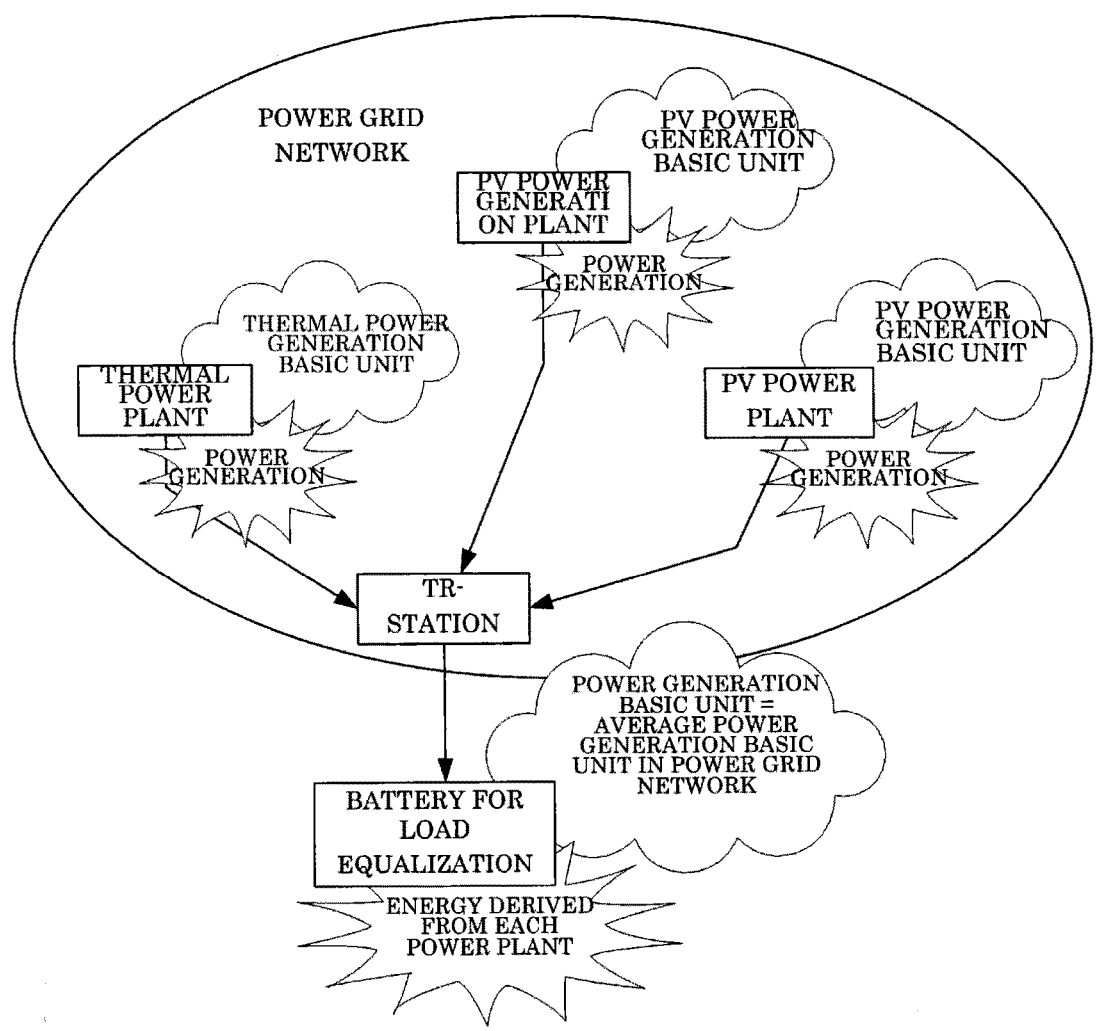
FIG. 5 is an exemplary diagram illustrating a power generation basic unit of batteries installed in a transformer station in association therewith.

In addition, as illustrated in FIG. 5, the battery 23 installed in the transformer station 22 for the purpose of a load equalization has the energy derived from one or several power plants 21 that had generated power which had passed through the transformer station 22. Hence, the power generation basic unit of the battery 23 installed for the purpose of a load equalization is a value obtained by averaging the power generation basic units of the power plants 21 in the power grid network 2.

As explained above, the application information D5 of the battery 23 can function as derivation information indicating the derivation of the energy stored in the battery 23. Hence, the basic unit determiner 142 receives, through the communication network, the application information D5 of the battery 23, the power generation basic unit information D3 of the power plant 21 in which the battery 23 is installed, and the average power generation basic unit information D8 from the facility DB 11.

In the case of the application information D5 indicating a fluctuation suppression application, the power generation basic unit of the battery 23 associated with that application information D5 is a value indicated by the power generation basic unit information D3 of the power plant 21 in which the battery 23 is installed. In the case of the application information D5 indicating a load equalization application, the power generation basic unit of the battery 23 associated with that application information D5 is a value indicated by the average power generation basic unit information D8.

The list creator 143 creates a list of power generation facilities. As illustrated in FIG. 6, the list contains records that are information to specify each power generation facility and the power-generation-quantity information associated with each other. The records are listed in a manner sorted in the order of a smaller basic unit.

The adder 144 selects the power generation facility from the list in such a way that the total power generation quantity matches the demand quantity. This adder 144 sequentially adds the numeric value of the power-generation-quantity information stored in the record to the total power generation quantity. The records are sequentially extracted in the order of a smaller basic unit until the total power generation quantity matches the demand quantity.

The presenter 16 includes a display or a printer, and outputs the created operation schedule. The output operation schedule contains information indicating an environmental load in addition to the power generation facility to be operated and the power generation quantity. The power generation facility to be operated corresponds to the information indicating the power generation facility stored in the extracted record, and the power generation quantity corresponds to the power-generation-quantity information associated with the information indicating that power generation facility. The information indicating the environmental load is a total of all multiplication results of the power-generation-quantity information associated with the information indicating the power generation facility by the basic unit.

(Operation)

Figure 7:
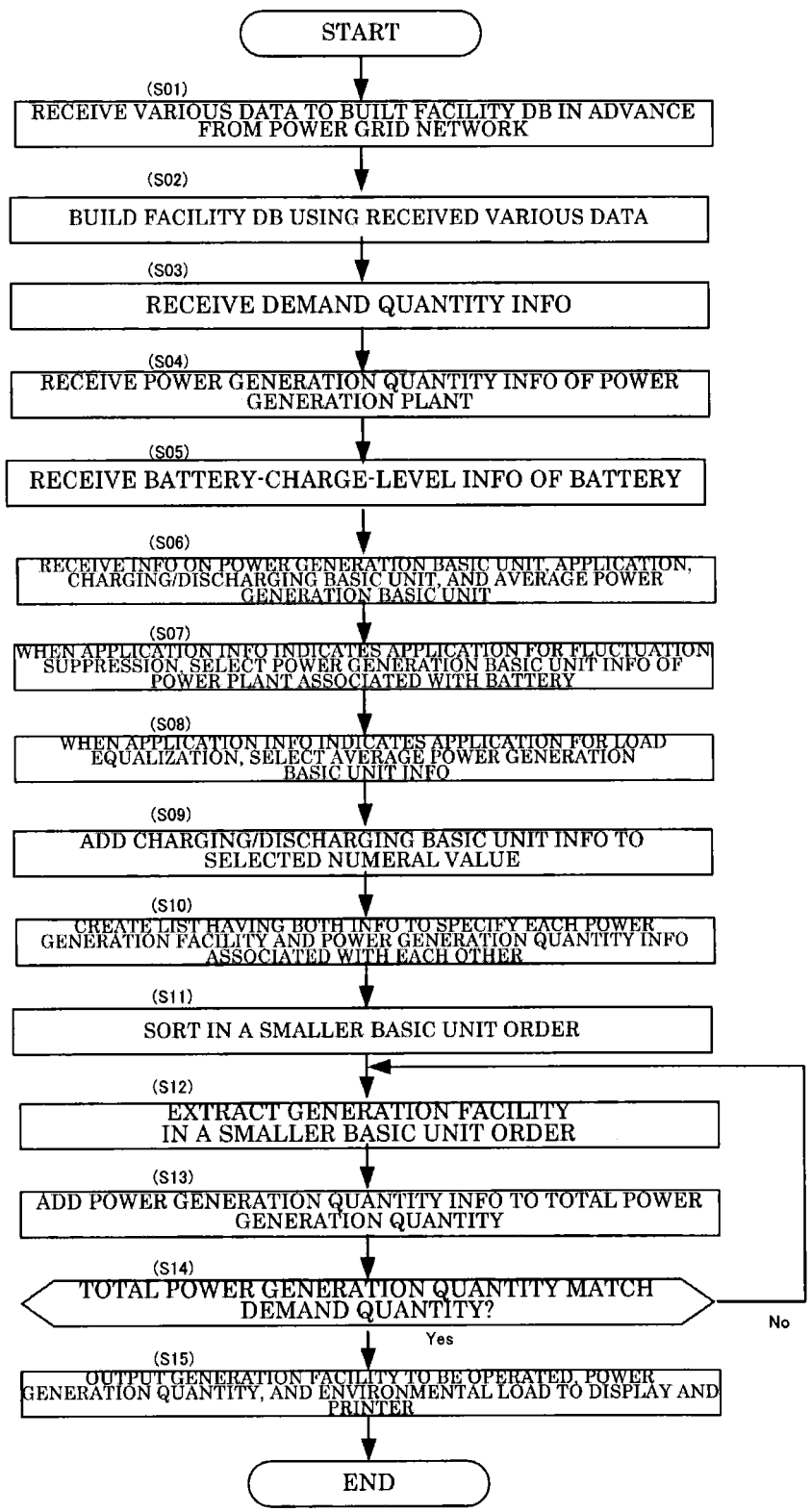
FIG. 7 is a flowchart illustrating an operation schedule creating method by the operation planning system according to the first embodiment.

An operation schedule creating method by such an operation planning system will be explained with reference to FIG. 7. FIG. 7 is a flowchart indicating an operation schedule creating method.

First, the facility-DB generator 12 receives (step S01) beforehand various data to construct the facility DB 11 from the power grid network 2. The receiving cycle is a preset cycle. The received data includes the power generation basic unit information D3, the battery-charge-level information D4, the charging/discharging basic unit information D6, and the application information D5.

When receiving the various data, the facility-DB generator 12 organizes those pieces of data in accordance with a format, or performs a calculation to construct (step S02) the facility DB 11. That is, the data is associated with the information specifying the power generation facility. In addition, the average power generation basic unit information D8 of the power grind network 2 is calculated by adding the power generation basic unit information D3, and the calculated result is stored in the facility DB 11.

When the user specifies a predetermined condition through the man-machine interfaces, the condition determiner 13 receives (step S03) the demand quantity information D1 from the demand predicting system 3. In setting of the condition, the date and time to plan an operation schedule are entered. When the date and time are entered, the condition determiner 13 transmits date and time information to the demand predicting system 3, and the demand predicting system 3 transmits the demand quantity information D1 in a time slot indicated by the date and time information to the operation planning system 1.

When receiving the demand quantity information D1, the operation schedule calculator 14 creates an operation schedule in accordance with the demand quantity information D1 so as to decrease the environmental load.

First, the power-generation-quantity determiner 141 receives (step S04) the power-generation-quantity information D7 of the power plant 21 from the operation planning DB 4, and receives (step S05) the battery-charge-level information D4 of the battery 23 from the facility DB 11. The power-generation-quantity determiner 141 stores the received power-generation-quantity information D7 and the battery-charge-level information D4 in association with the power generation facility.

Next, the basic unit determiner 142 receives (step S06) the power generation basic unit information D3, the application information D5, the charging/discharging basic unit information D6, and the average power generation basic unit information D8 from the facility DB 11. Next, when the application information D5 of the battery 23 indicates an application for a fluctuation suppression, the basic unit determiner 142 selects (step S07) the power generation basic unit information D3 of the power plant 21 in which that battery 23 is installed, and, when the application information D5 indicates an application for a load equalization, the basic unit determiner selects (step S08) any one of the average power generation basic unit information D8. Subsequently, the charging/discharging basic unit information D6 is added (step S09) to the selected numeric value, and the obtained result is taken as the power generation basic unit related to the battery 23.

Next, the list creator 143 creates (step S10) a list associating both information to specify each power generation facility and power-generation-quantity information with each other, and sorts (step S11) the records in the order of a smaller basic unit.

When the list sorted in the order of the smaller basic unit is created, the adder 144 extracts (step S12) the power generation facility in the order of the smaller basic unit, and adds (step S13) the power-generation-quantity information corresponding to that power generation facility to the total power generation quantity. The steps S12 and S13 are repeated until the demand quantity and the total power generation quantity become consistent with each other (step S14: YES).

When extraction of the power generation facility completes, the presenter 16 outputs (step S15) the power generation facility to be operated, the power generation quantity, and the environmental load to the display or the printer. The environmental load can be calculated by multiplying the power generation basic unit information of the extracted power generation facility by the power-generation-quantity information, and totaling the respective multiplication results.

Advantageous Effects

As explained above, the operation planning system 1 that plans a power generation operation schedule to the power grid network 2 interconnecting, through a power system, the multiple power plants 21, the multiple transformer stations 22, and the multiple batteries 23 installed in association therewith includes the condition determiner 13, the facility DB 11, the basic unit determiner 142, and the adder 144.

The condition determiner 13 decides the condition of the operation schedule, and receives the demand quantity information D1 of power in accordance with the decision. The facility DB 11 stores in advance the power generation basic unit information D3 of the power plant 21 and the derivation information of the stored energy in the battery 23. For example, the derivation information is the application information D5 indicating the application of the battery 23. The basic unit determiner 142 decides the power generation basic unit information of the battery 23 to which the power generation basic unit of the stored energy is added based on the power generation basic unit information D3 of the power plant 21 and the derivation information of the stored energy. The adder 144 sequentially adds, while selecting the power generation facility from the power plants 21 and the batteries 23 in the order of the smaller value indicated by the power generation basic unit information, the power generation quantity of the selected power generation facility to the total power generation quantity until the total power generation quantity matches the demand quantity. Accordingly, the operation planning system 1 creates an operation schedule presenting the power generation facility in accordance with the demand quantity, and each power generation quantity.

The application information D5 indicates an application for a fluctuation suppression to the battery 23 installed in association with the power plant 21, and when the application information D5 indicates the application for a fluctuation suppression, the basic unit determiner 142 can add the power generation basic unit information D3 of the power plant where the battery 23 is installed to the power generation basic unit information of the battery 23 associated with that application information D5. In addition, the application information D5 indicates an application for a load equalization to the battery 23 installed in association with the transformer station 22. When the application information D5 indicates the application for a load equalization, the basic unit determiner 142 can add, to the power generation basic unit information of the battery 23 associated with the application information D5, an average value of the numeric values indicated by the power generation basic unit information of the respective power plants 21 in the power grid network 2.

As explained above, a true environmental load of the battery 23 can be found in consideration of the derivation of energy stored in the battery 23. Hence, the power generation facility having a little environmental load can be precisely extracted, thereby reducing the environmental load.

In addition, the facility DB 11 may further store the charging/discharging basic unit information D6 indicating the environmental load due to a charging/discharging loss by the battery 23, and the basic unit determiner 142 may add the numeric value indicated by the charging/discharging basic unit information D6 to the power generation basic unit of the battery 23. This enables a further precise calculation of the environmental load of the battery 23.

This operation planning system 1 may be provided in a local power-feeding instruction station L connected to the power grid network 2 and the central power-feeding instruction station C. It may be installed in the central power-feeding instruction station C, but when installed in the local power-feeding instruction station L, improvement due to a competition for the reduction of the environmental load substance among the local areas can be accelerated, and the power generation facility to be substituted by the battery 23 can be clarified.

(Second Embodiment)

An explanation will now be given of an operation schedule planning method by an operation planning system according to a second embodiment. Some power generation facilities are operated in a manner linked with other power generation facility. In this embodiment, those power generation facilities operated in a linked manner are collectively estimated as a single section to create an operation schedule. Operations other than the selection of the section, the decision of the power generation quantity of the section, and the decision of the basic unit of the operated section are the same as those of the first embodiment, and thus the detailed explanation thereof will be omitted.

(Configuration)

Figure 8:
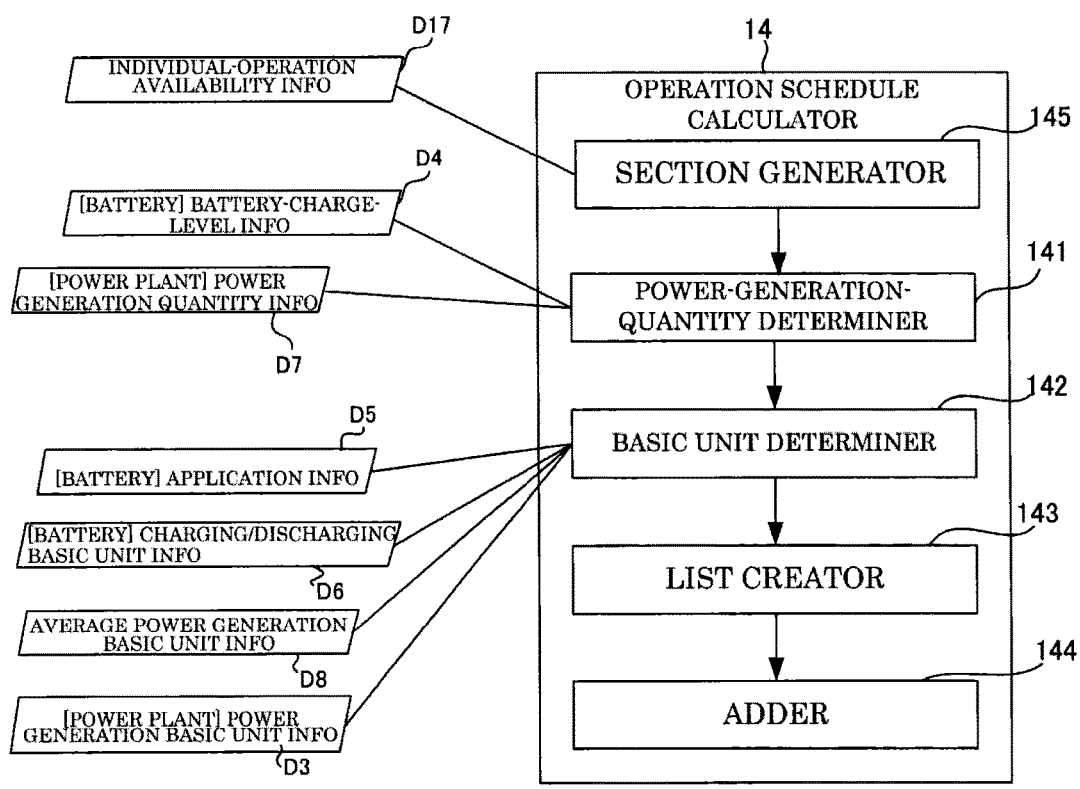
FIG. 8 is a block diagram illustrating an operation schedule calculator according to a second embodiment.

FIG. 8 is a block diagram illustrating an operation schedule calculator 14 according to a second embodiment. This operation schedule calculator 14 further includes a section generator 145. The section generator 145 receives individual-operation availability information D17 from the operation planning DB 4.

The individual-operation availability information D17 contains information to specify linked power generation facilities. When, for example, it is necessary for a PV power plant 21 and a battery 23 installed in association therewith to operate cooperatively, pieces of information to specify respective plant and battery are described in the individual-operation availability information D17 in association with each other. In addition, when the multiple batteries 23 must operate cooperatively, pieces of information to specify the respective batteries are described in the individual-operation availability information D17 in association with each other.

The section generator 145 looks up the individual-operation availability information D17 to configure a section, and instructs the power-generation-quantity determiner 141, the basic unit determiner 142, and the list creator 143 to decide the power generation quantity for each section, and to decide the basic unit. More specifically, a list indicating the section of the power generation facilities is created, and the power-generation-quantity determiner 141, the basic unit determiner 142, and the list creator 143 are caused to look up the list.

The power-generation-quantity determiner 141 looks up the list, totals the power-generation-quantity information D7 on the power generation facilities combined in the list and received from the facility DB 11, and associates the total result as the power-generation-quantity information of this section. When only one power generation facility is associated with one section in the list, no totaling is necessary.

The basic unit determiner 142 multiplies the basic units of the respective power generation facilities by the power generation quantity to calculate an environmental load quantity. Next, the basic unit determiner totals the environmental load quantity of the respective power generation facilities in the section to obtain a total environmental load quantity, and totals the power generation quantities of the respective power generation facilities in the section to obtain a total power generation quantity. Subsequently, the basic unit determiner divides the total environmental load quantity by the total power generation quantity, thereby calculating a basic unit of the section.

The list creator 143 sorts records having information to specify the section, and the total power generation quantity thereof paired in the order of the smaller basic unit of the section to create a list.

(Operation)

Figure 9:
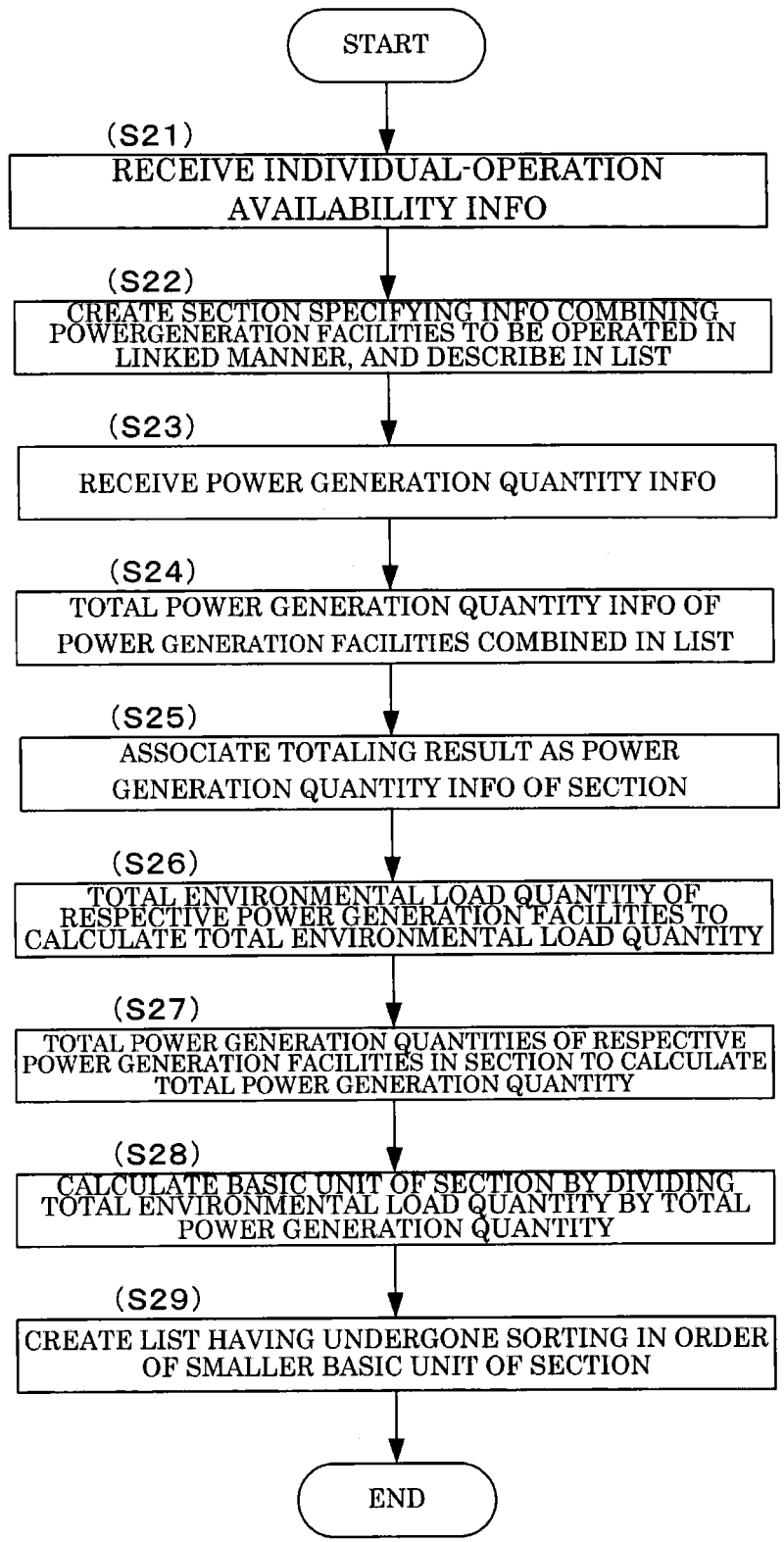
FIG. 9 is a flowchart illustrating an operation of the operation schedule calculator according to the second embodiment.

FIG. 9 is a flowchart illustrating an operation of the operation schedule calculator 14 of the second embodiment. First, the section generator 145 receives (step S21) the individual-operation availability information D17 from the operation planning DB 4. When receiving the individual-operation availability information D17, the section generator 145 looks up the individual-operation availability information D17, creates section specifying information having a combination of the power generation facilities to be operated in a linked manner, and describes (step S22) the section specifying information in the list.

The power-generation-quantity determiner 141 receives (step S23) the power-generation-quantity information D7 from the facility DB 11, totals (step S24) the pieces of power-generation-quantity information D7 of the power generation facilities combined in the list, and associates (step S25) the totaling result as the power-generation-quantity information of this section.

The basic unit determiner 142 multiplies the basic unit of each power generation facility by the power generation quantity to calculate the environmental load quantity, and totals the environmental load quantities of the respective power generation facilities in the section to obtain (step S26) the total environmental load quantity, and totals the power generation quantities of the respective power generation facilities in the section to obtain (step S27) the total power generation quantity. Subsequently, the basic unit determiner divides the total environmental load quantity by the total power generation quantity to calculate (step S28) the basic unit of the section.

The list creator 143 sorts the records having the information to specify the section, and the total power generation quantity thereof paired in the order of the smaller basic unit of the section to create (step S29) the list.

Advantageous Effects

As explained above, the operation planning system 1 of this embodiment includes the section generator 145 and the power-generation-quantity determiner 141. The section generator 145 generates the section information associating the power generation facilities to be operated in a linked manner with each other. The power-generation-quantity determiner 141 totals the power generation quantities of the respective power generation facilities in the section information to decide the power generation quantity of the whole section. The basic unit determiner 142 calculates the basic unit of this section based on the power generation quantity of each power generation facility in the section and the basic unit thereof, and the adder 144 adds, while selecting the section in the order of a smaller value indicated by the power generation basic unit information D3, the power generation quantity of the selected section to the total power generation quantity until the total power generation quantity matches the demand quantity. Hence, it becomes possible for the operation planning system to avoid a case in which only one of the power generation facilities to be operated in a linked manner is contained in the operation schedule which will be inexecutable, but to create a further detailed operation schedule.

(Third Embodiment)

An explanation will be given of an operation schedule planning method by an operation planning system according to a third embodiment. The operation schedule planning method of this embodiment has the situation of each power generation facility taken into consideration when deciding the power generation quantity of the power generation facility. The other structures are the same as those of the first or second embodiment or the combination thereof, and thus the detailed explanation thereof will be omitted.

(Configuration)

Figure 10:
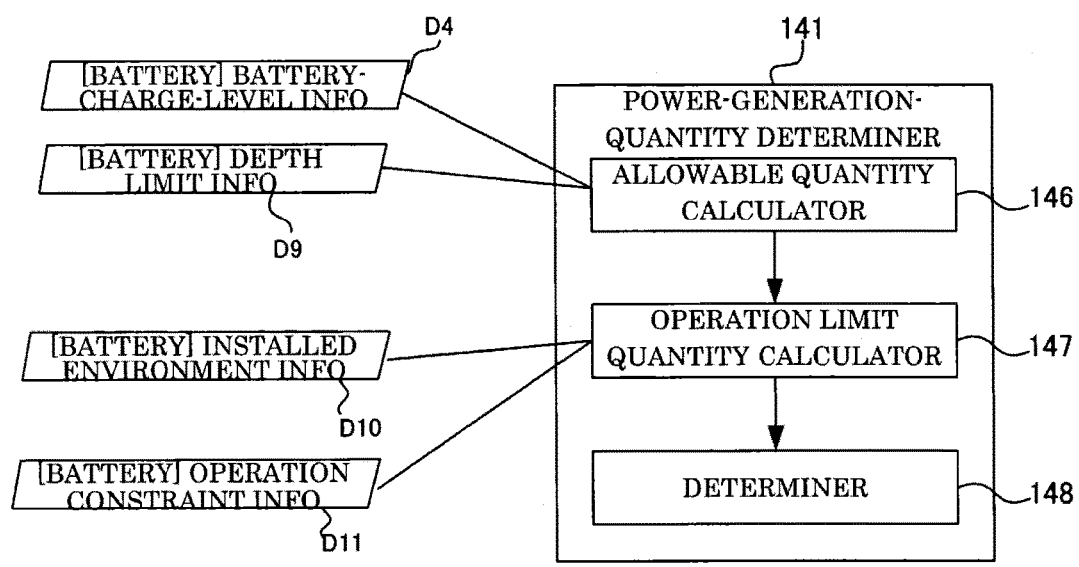
FIG. 10 is a block diagram illustrating a power-generation-quantity determiner according to a third embodiment.

FIG. 10 is a block diagram illustrating a power-generation-quantity determiner 141 of the third embodiment. The power-generation-quantity determiner 141 includes an allowable quantity calculator 146 that calculates an allowable discharging quantity of the battery 23, an operation limit quantity calculator 147 that calculates the discharging operation limit quantity of the battery 23, and a determiner 148 that determines which one of the allowable discharging quantity and the discharging operation limit quantity is accepted. This power-generation-quantity determiner 141 calculates the power generation quantity on the battery 23 using, in addition to the battery-charge-level information D4, depth limit information D9, installed environment information D10, and operation constraint information D11.

Figure 11:
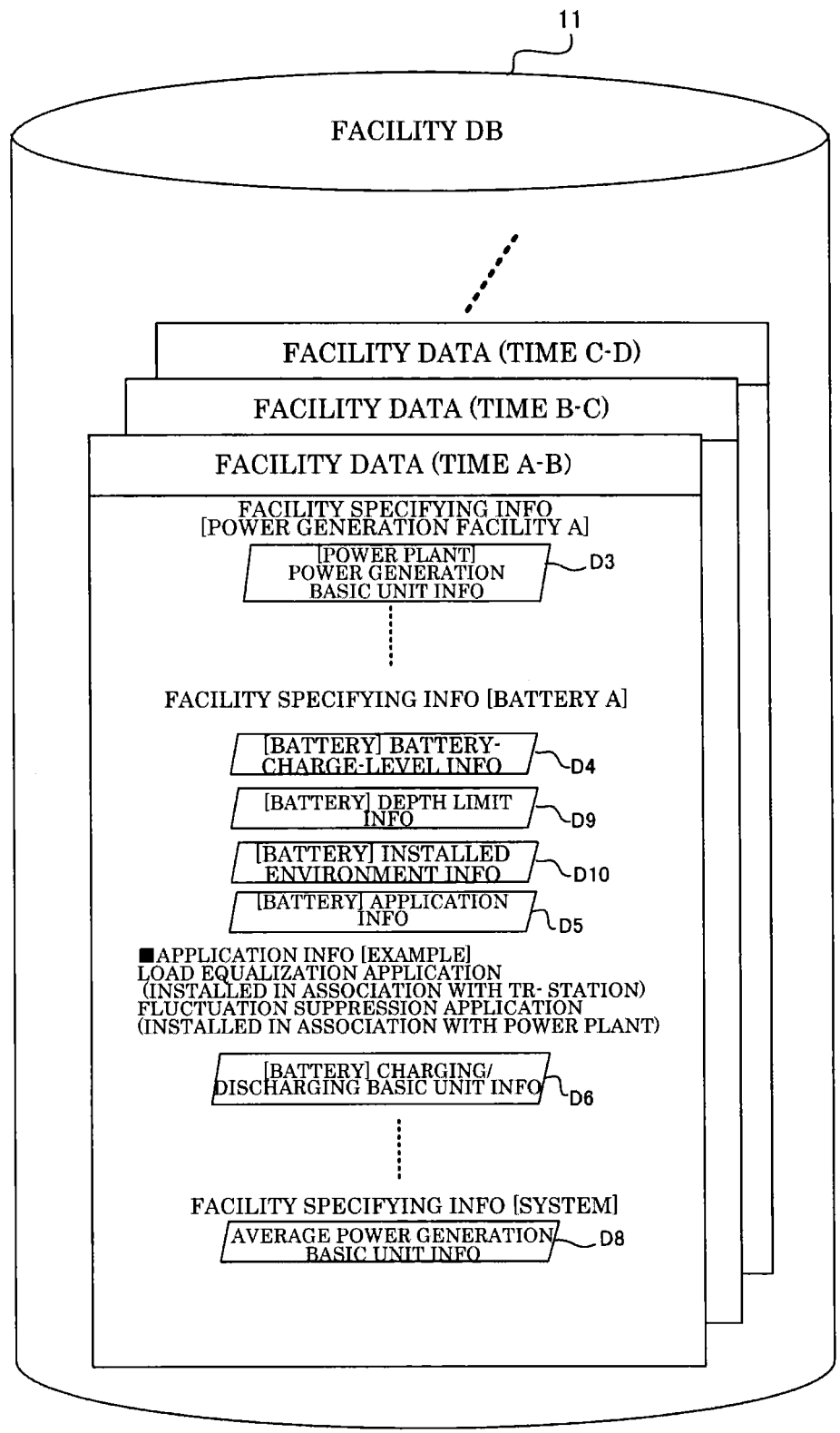
FIG. 11 is an exemplary diagram illustrating a facility DB according to the third embodiment.

As illustrated in FIG. 11, the facility DB 11 further stores the depth limit information D9 and the installed environment information D10 relating to the battery 23. The depth limit information D9 indicates the lower limit of the stored energy in the battery 23, and is expressed as a ratio to the full charge condition or a remaining battery charge. The installed environment information D10 is information indicating the installed environment of the battery 23, and contains numeric data, such as the surrounding temperature of the battery 23, the internal temperature, and the internal temperature rise.

Those depth limit information D9 and the installed environment information D10 are received in advance by the facility-DB generator 12 through the communication network from the power grid network 2, and are recorded in the facility DB 11.

Figure 12A:
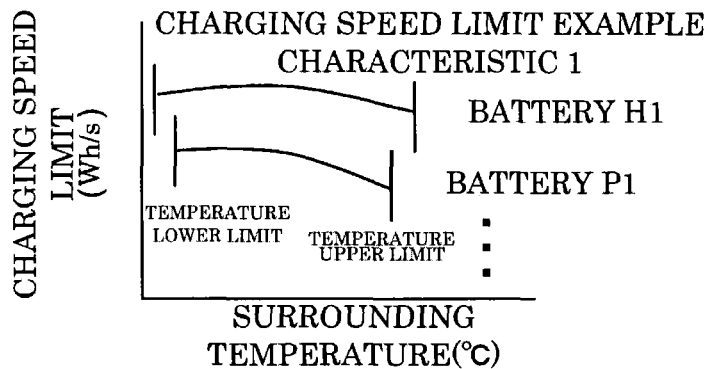
FIGS. 12A to 12D are each a graph indicating operation constraint information according to the third embodiment.
Figure 12B:
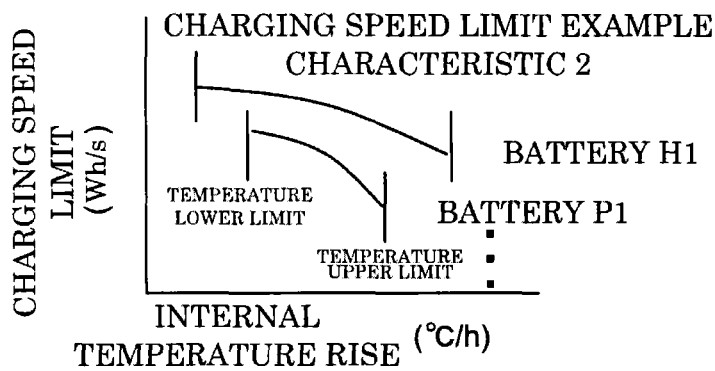
Figure 12C:
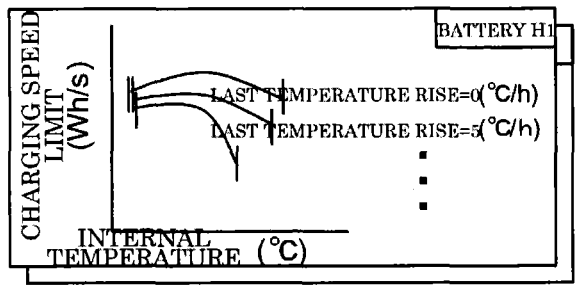
Figure 12D:
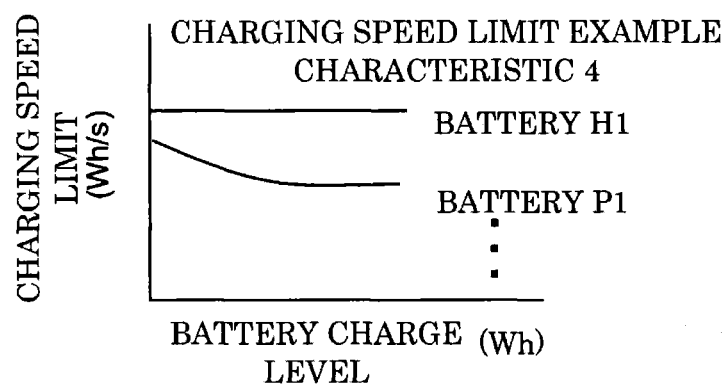

In addition, as illustrated in FIGS. 12A to 12D, the operation constraint information D11 indicates the discharging limit speed (Wh/s) of the battery 23 in operation relative to the temperature and the battery charge level. As illustrated in FIG. 12A, for example, the operation constraint information D11 indicates a relationship between the surrounding temperature of the battery 23 and the discharging limit speed. Moreover, the operation constraint information D11 indicates, for example, a relationship between the internal temperature rise of the battery 23 and the discharging limit speed. Furthermore, the operation constraint information D11 indicates, for example, the internal temperature and a relationship between the internal temperature information and the discharging limit speed. Still further, the operation constraint information D11 indicates, for example, a relationship between the battery charge level and an azimuth power resumption speed.

(Operation)

Figure 13:
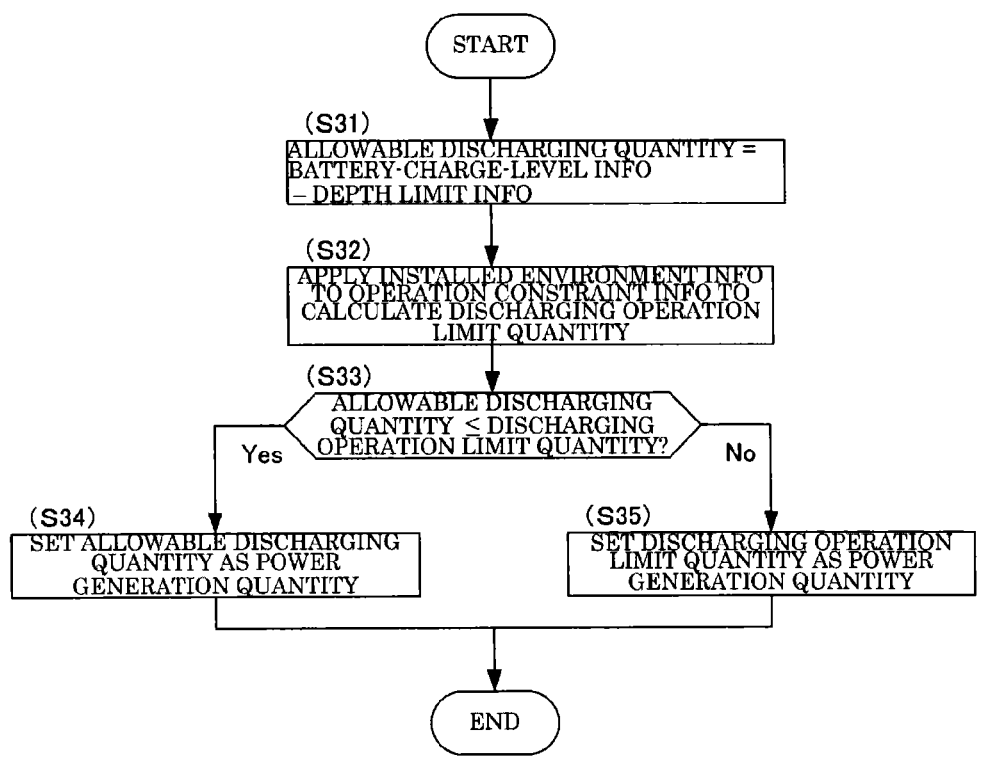
FIG. 13 is a flowchart illustrating an operation of the power-generation-quantity determiner according to the third embodiment.

FIG. 13 is a flowchart illustrating an operation of the power-generation-quantity determiner 141. As illustrated in FIG. 13, first, the allowable quantity calculator 146 subtracts the value indicated by the depth limit information D9 from the value indicated by the battery-charge-level information D4 to calculate (step S31) the allowable discharging quantity of the battery 23. When the depth limit information D9 is a ratio to the full charge condition, such a ratio is multiplied by the rated capacity to obtain the lower limit of the stored energy.

Next, the operation limit quantity calculator 147 applies the installed environment information D10 to the operation constraint information D11 to obtain (step S32) the discharging operation limit quantity.

Subsequently, the determiner 148 sets (step S34) the power generation quantity as the allowable discharging quantity when allowable discharging quantity is equal to or smaller than discharging operation limit quantity (step S33: YES). When allowable discharging quantity is greater than discharging operation limit quantity (step S33: NO), the power generation quantity is set as the discharging operation limit quantity (step S35).

Advantageous Effects

As explained above, the operation planning system 1 of this embodiment includes the power-generation-quantity determiner 144 that decides the discharging quantity of the battery 23. Next, this power-generation-quantity determiner 144 includes the allowable quantity calculator 146 that calculates the allowable discharging quantity obtained by subtracting the lower limit value of the battery remaining battery charge from the charged energy of the battery 23, the operation limit quantity calculator 147 that calculates the discharging operation limit quantity from the limit of the discharging speed of the battery 23 based on the installed environment of the battery 23, and the determiner 148 that compares the allowable discharging quantity with the discharging operation limit quantity to set either one of those as the discharging quantity of the battery 23. Accordingly, it becomes possible for the operation planning system to create a further precise operation schedule utilizing the battery 23.

(Fourth Embodiment)

An explanation will now be given of an operation schedule planning method by an operation planning system according to a fourth embodiment. A detailed explanation for the same configuration as that of the first to third embodiments or the combination thereof will be omitted. This operation planning system distributes an environmental load caused in manufacturing and disposing processes to each charging/discharging cycle, and adds a value obtained by dividing the environmental load by the lifetime cycle number of the battery 23 to the basic unit of the battery 23. The lifetime cycle number is a number of capable charging/discharging until the battery 23 reaches its lifetime. The lifetime means a stage at which the battery 23 becomes unable to store preset quantity of energy.

(Configuration)

Figure 14:
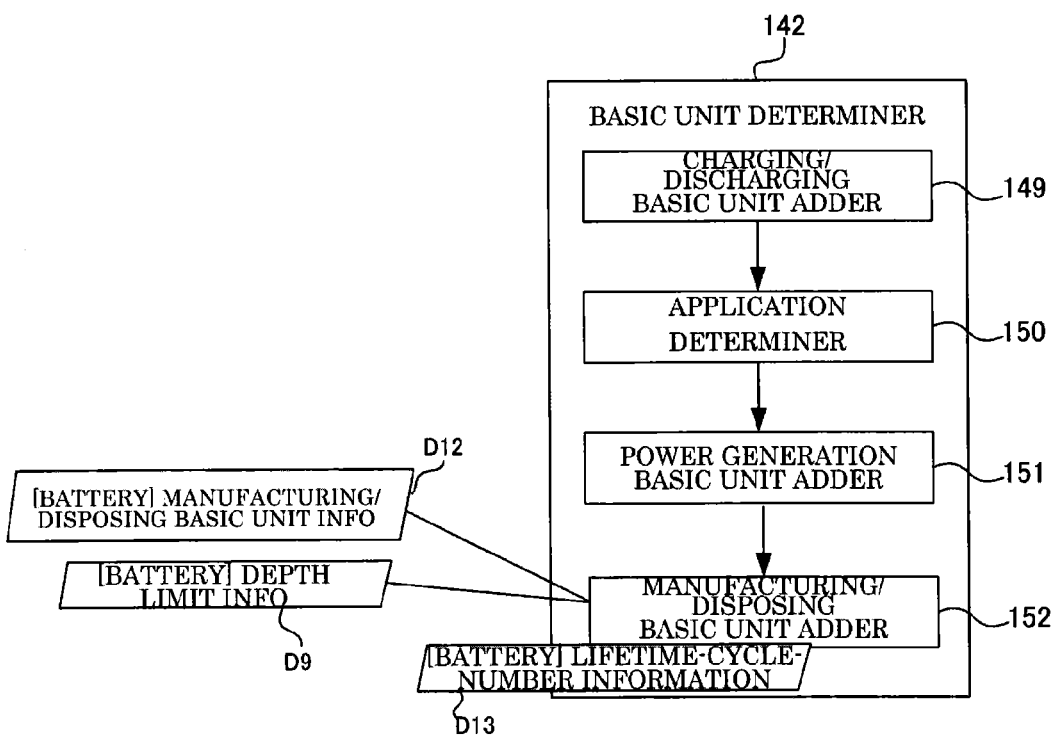
FIG. 14 is a block diagram illustrating a basic unit determiner according to a fourth embodiment.

FIG. 14 is a block diagram illustrating the basic unit determiner 142 according to the fourth embodiment. As illustrated in FIG. 14, the basic unit determiner 142 includes a charging/discharging basic unit adder 149, an application determiner 150, a power generation basic unit adder 151, and a manufacturing/disposing basic unit adder 152.

Like the first embodiment, the charging/discharging basic unit adder 149, the application determiner 150, and the power generation basic unit adder 151 receive the charging/discharging basic unit information D6 from the facility DB 11, add the received information to the basic unit of the battery 23, determine the derivation of the energy of the battery 23 from the application information D5, receive the power generation basic unit information D3 of the power plant 21 or the average power generation basic unit information D8 thereof from the facility DB 11, and add the received information to the basic unit of the battery 23.

The manufacturing/disposing basic unit adder 152 adds, to the basic unit of the battery 23, a value obtained by dividing the environmental load caused by manufacturing and disposing processes by the lifetime cycle number of the battery 23. Manufacturing/disposing basic unit information D12 representing the environmental load caused by manufacturing and disposing processes is received in advance by the facility-DB generator 12 from the power grid network 2, and is stored in the facility DB 11.

Figure 15:
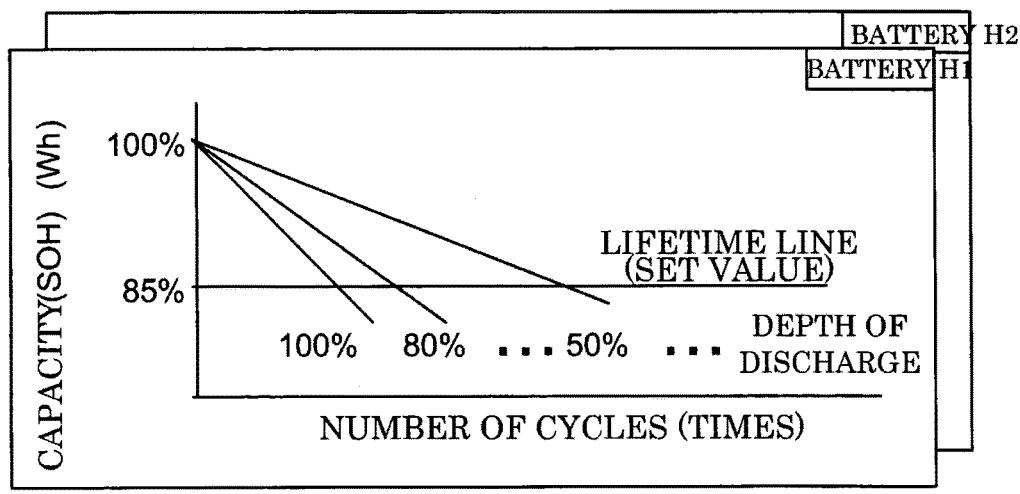
FIG. 15 is a graph indicating lifetime cycle number information on a battery.

Lifetime-cycle-number information D13 of the battery 23 is stored in advance by the manufacturing/disposing basic unit adder 152. FIG. 15 is a graph indicating the lifetime-cycle-number information D13 of the battery 23. The manufacturing/disposing basic unit adder 152 stores, for each lower limit of depth of discharge in advance, a graph representing a relationship between the charging limit capacity of the battery 23 and the number of cycles until the battery reaches the lifetime. This lifetime-cycle-number information D13 is stored in advance for each kind of the battery 23. The kinds of the battery 23 are distinguished by, for example, product types.

(Operation)

Figure 16:
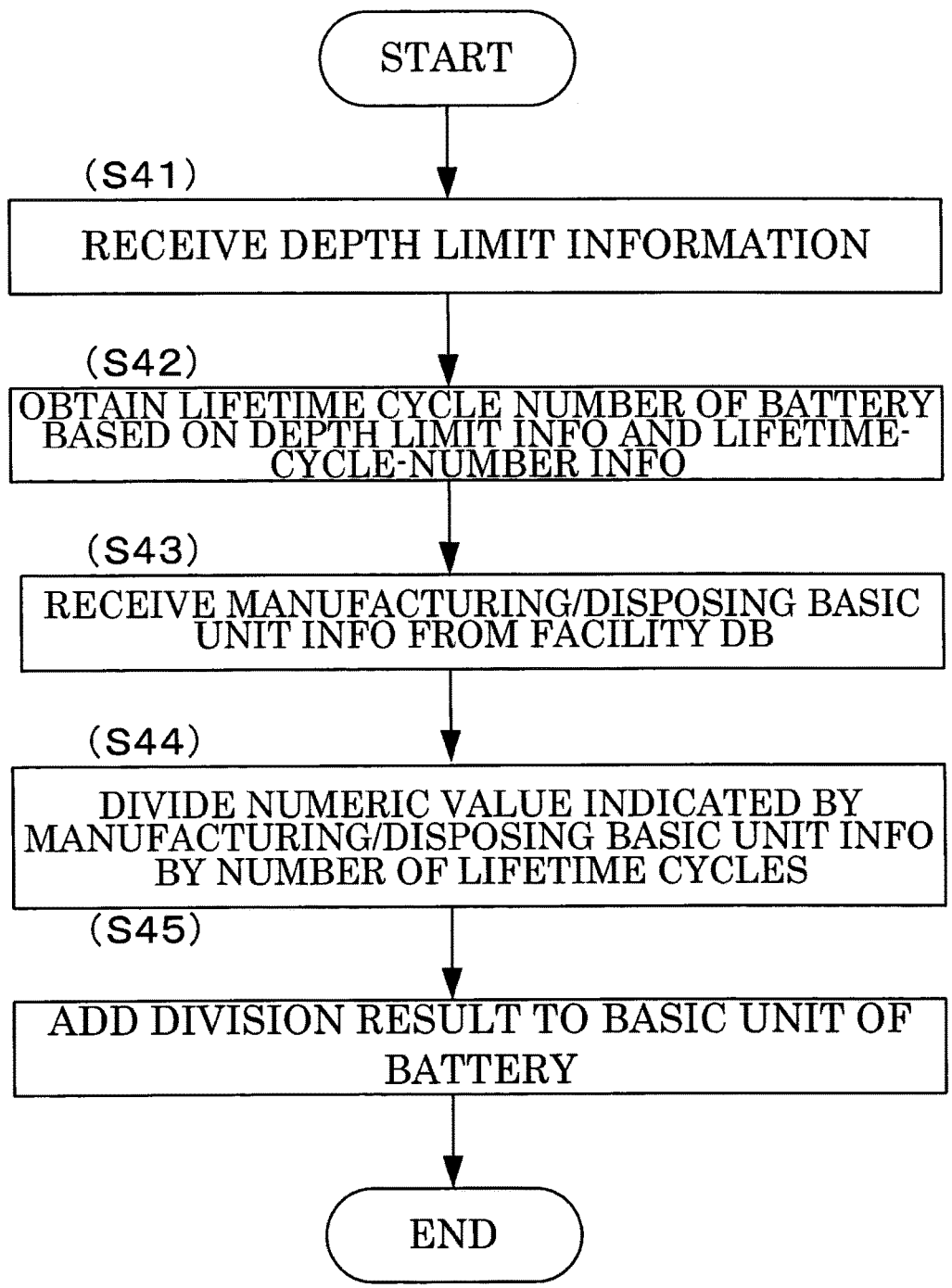
FIG. 16 is a flowchart illustrating a process of adding an environmental load caused through manufacturing and disposing processes to the basic unit of a battery according to the fourth embodiment.

FIG. 16 illustrates a process by the manufacturing/disposing basic unit adder 152. FIG. 16 is a flowchart illustrating a process of adding the environmental load caused by manufacturing/disposing processes to the basic unit of the battery 23. First, the manufacturing/disposing basic unit adder 152 receives (step S41) the depth limit information D9 from the facility DB 11, and obtains (step S42) the number of lifetime cycles of the battery 23 from the depth limit information D9 and the lifetime-cycle-number information D13. Next, the manufacturing/disposing basic unit adder 152 receives (step S43) the manufacturing/disposing basic unit information D12 from the facility DB 11, divides (step S44) the numeric value indicated by the manufacturing/disposing basic unit information D12 by the lifetime cycle number, and adds (step S45) the result to the basic unit of the battery 23.

Whether or not to add the environmental load caused by manufacturing/disposing processes to the basic unit may be set in advance by the user through man-machine interfaces. This setting may be made for each battery 23.

Advantageous Effects

As explained above, according to the operation planning system 1 of this embodiment, the facility DB 11 further stores the manufacturing/disposing basic unit information D12 indicating the environmental load caused by the manufacturing/disposing processes of the battery 23, and the basic unit determiner 142 adds, to the basic unit of the battery 23, a value obtained by distributing the environmental load indicated by the manufacturing/disposing basic unit information D12 to respective charging/discharging cycles. As to the number of cycles until the battery reaches the lifetime, the lifetime-cycle-number information D13 indicating such number of cycles may be stored for each lower limit of depth of discharge of the battery 23, and the number of cycles may be calculated based on the depth limit information D9.

Accordingly, the environmental load caused by the manufacturing/disposing processes of the battery 23 can be also taken into consideration, and the environmental load by the battery 23 can be further precisely examined. Therefore, a power generation facility that has a little environmental load can be further precisely extracted, thereby reducing the environmental load.

(Fifth Embodiment)

An explanation will be given of an operation schedule creating method by an operation planning system according to a fifth embodiment. Detailed explanation for the same configuration as that of the fourth embodiment will be omitted. This operation planning system distributes the environmental-load reduction effect by recycling the battery 23 to each charging/discharging cycle.

(Configuration)

Figure 17:
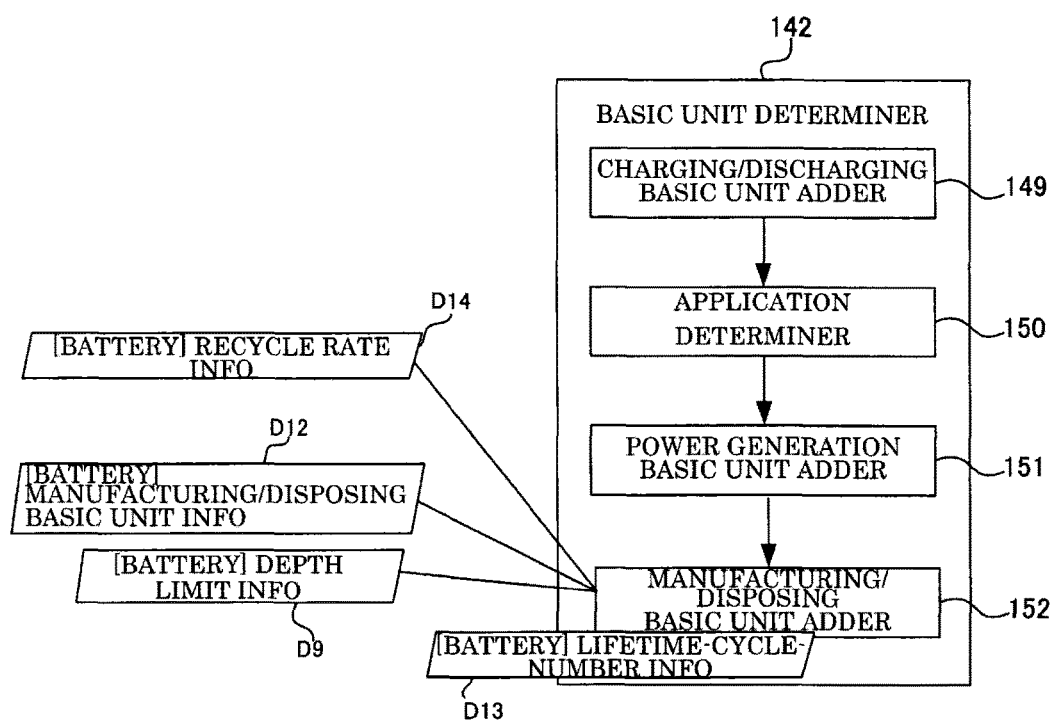
FIG. 17 is a block diagram illustrating a basic unit determiner according to a fifth embodiment.

In this embodiment, as illustrated in FIG. 17, the manufacturing/disposing basic unit adder 152 further receives recycle rate information D14 from the facility DB 11. Next, the value indicated by the manufacturing/disposing basic unit information D12 is multiplied by the rate indicated by the recycle rate information D14 to reflect the environmental-load reduction effect by recycling.

The recycle rate information D14 indicates a total rate of respective environmental loads caused by manufacturing and disposing processes of reusable parts relative to the total of respective environmental loads caused by manufacturing and disposing processes of all components of the battery 23. The recycle rate information D14 is received in advance by the facility-DB generator 12 from the power grid network 2, and is stored in the facility DB 11.

(Operation)

Figure 18:
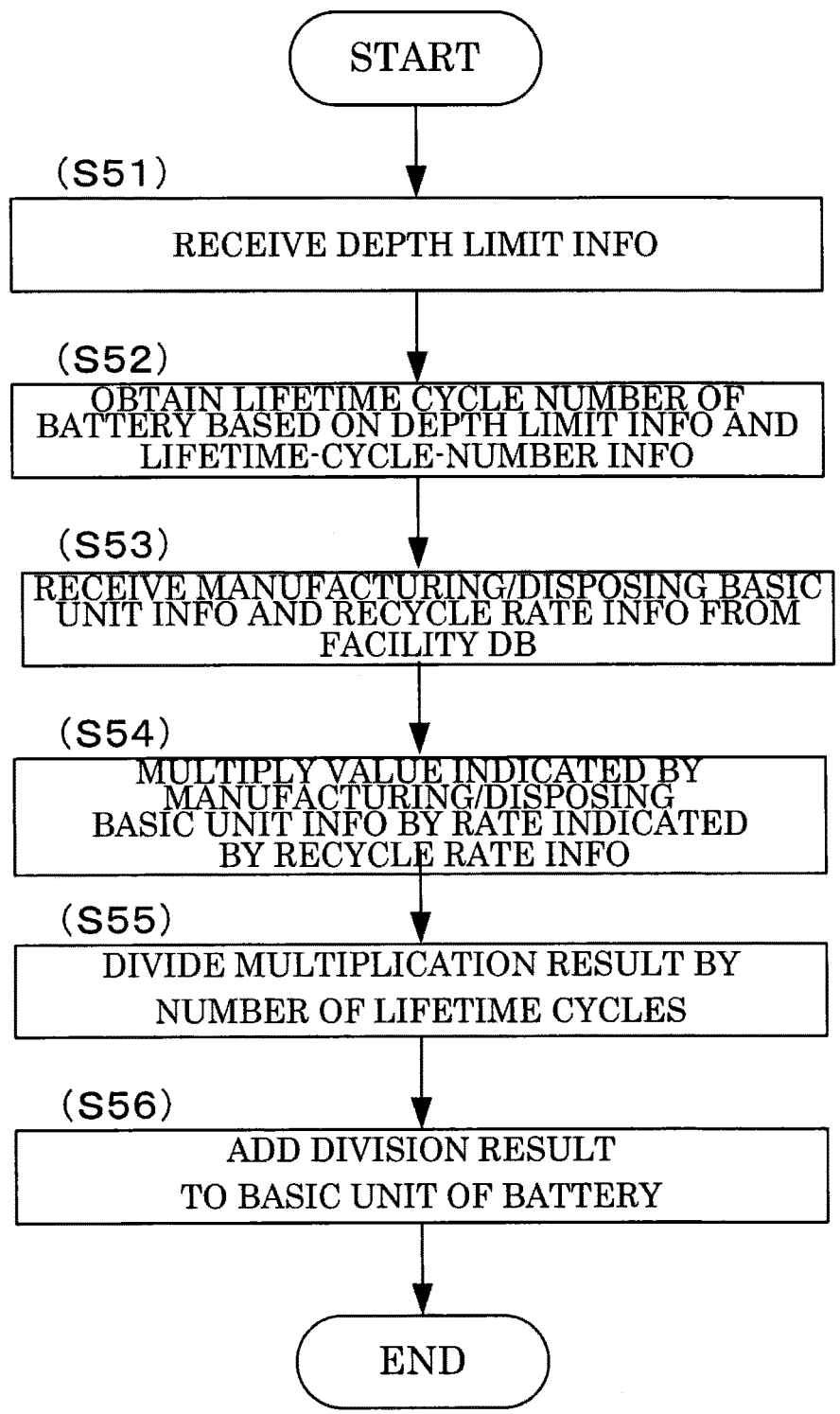
FIG. 18 is a flowchart illustrating an operation of a manufacturing/disposing basic unit adder according to the fifth embodiment.

FIG. 18 illustrates a process by this manufacturing/disposing basic unit adder 152. FIG. 18 is a flowchart illustrating an operation of the manufacturing/disposing basic unit adder 152 of this embodiment. First, the manufacturing/disposing basic unit adder 152 receives (step S51) the depth limit information D9 from the facility DE 11, and obtains (step S52) the lifetime cycle number of the battery 23 from the depth limit information D9 and the lifetime-cycle-number information D13. Next, the manufacturing/disposing basic unit adder 152 receives (step S53) the manufacturing/disposing basic unit information D12 and the recycle rate information D14, and multiplies (step S54) the value indicated by the manufacturing/disposing basic unit information D12 by the rate indicated by the recycle rate information D14. Next, the multiplication result is divided (step S55) by the lifetime cycle number, and a result is added (step S56) to the basic unit of the battery 23.

Advantageous Effects

As explained above, according to the operation planning system 1 of this embodiment, the facility DB 11 further stores the recycle rate information D14 indicating the rate of the environmental load of the reusable part of the battery 23, and the basic unit determiner 142 multiplies the manufacturing/disposing basic unit information D12 by the rate indicated by the recycle rate information D14, and adds, to the basic unit of the battery, a value obtained by distributing the multiplication result to each charging/discharging cycle.

Accordingly, the environmental-load reduction effect by the recycling of the battery 23 can be also taken into consideration, and the environmental load of the battery 23 can be further precisely examined. Therefore, a power generation facility having a little environmental load can be further precisely extracted, thereby reducing the environmental load.

(Sixth Embodiment)

An explanation will be given of an operation schedule creating method by an operation planning system according to a sixth embodiment. The detailed explanation for the same configuration as those of first to fifth embodiments or a combination thereof will be omitted. This operation planning system distributes the environmental load caused by a maintenance work of the battery 23 to each charging/discharging cycle, and adds, to the basic unit of the battery 23, a value obtained by dividing the environmental load by the lifetime cycle number of the battery 23.

(Configuration)

Figure 19:
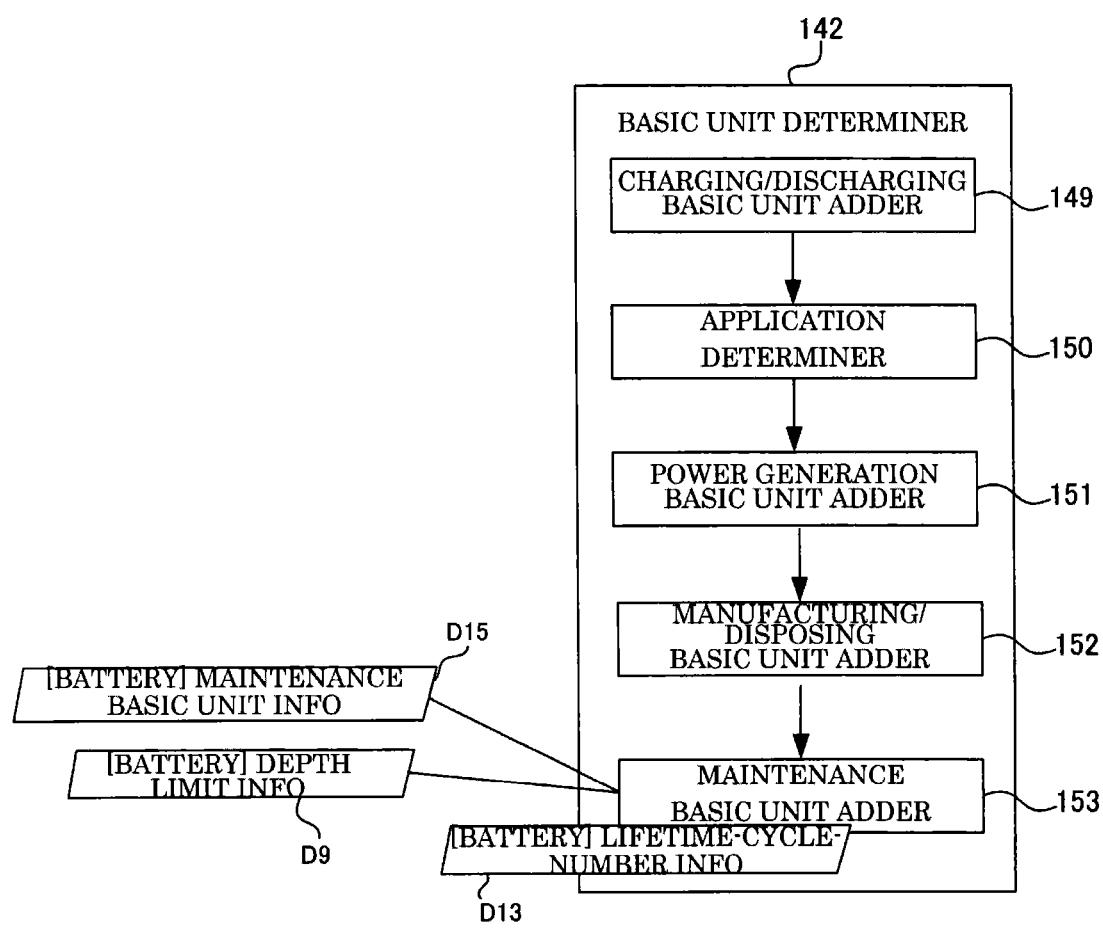
FIG. 19 is a block diagram illustrating a basic unit determiner according to a sixth embodiment.

FIG. 19 is a block diagram illustrating the basic unit determiner 142 of the sixth embodiment. As illustrated in FIG. 19, the basic unit determiner 142 includes, in addition to the manufacturing/disposing basic unit adder 152, a maintenance basic unit adder 153. The maintenance basic unit adder 153 adds, to the basic unit of the battery 23, a value obtained by dividing the environmental load caused by a maintenance work by the lifetime cycle number of the battery 23.

The environmental load caused by the maintenance work is, for example, a basic unit of consumed energy by an inspection apparatus in the maintenance work, and a basic unit of the environmental load caused by manufacturing/disposing processes of a replacement part in the maintenance work. Maintenance basic unit information D15 indicating the environmental load caused by the maintenance work is received in advance by the facility-DB generator 12 from the power grid network 2, and is stored in the facility DB 11.

(Operation)

Figure 20:
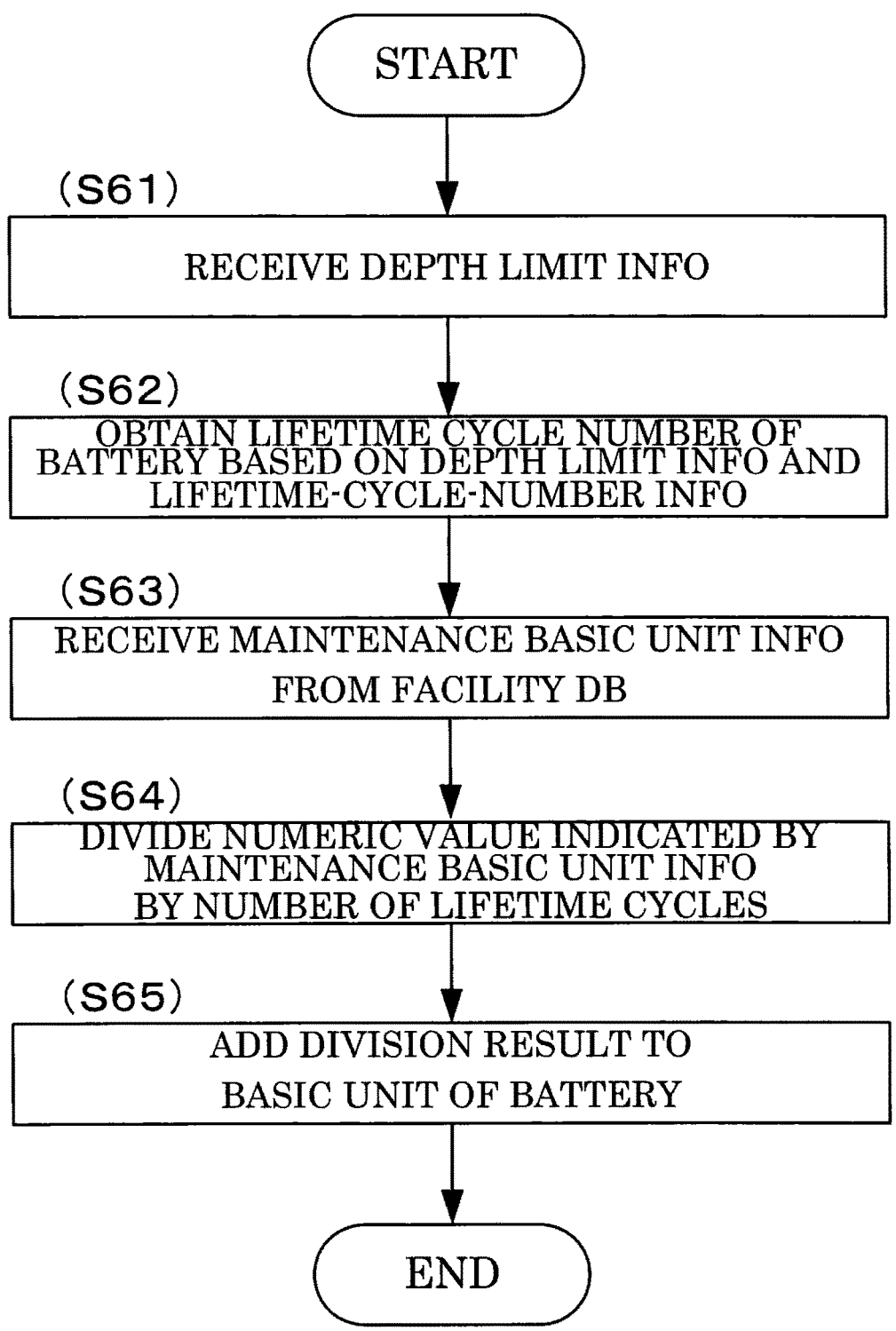
FIG. 20 is a flowchart illustrating a process of adding an environmental load caused through a maintenance work to the basic unit of a battery according to the sixth embodiment.

FIG. 20 is a process by the maintenance basic unit adder 153. FIG. 20 is a flowchart illustrating a process of adding the environmental load caused by a maintenance work to the basic unit of the battery 23. First, the maintenance basic unit adder 153 receives (step S61) the depth limit information D9 from the facility DB 11, and obtains (step S62) the lifetime cycle number of the battery 23 from the depth limit information D9 and the lifetime-cycle-number information D13. Next, the maintenance basic unit adder 153 receives (step S63) the maintenance basic unit information D14 from the facility DB 11, divides (step S64) a numeric value indicated by the maintenance basic unit information D14 by the lifetime cycle number, and adds (step S65) the result to the basic unit of the battery 23.

Whether or not the environmental load caused by the manufacturing/disposing processes to the basic unit may be set in advance by the user through man-machine interfaces. This setting may be made for each battery 23.

Advantageous Effects

As explained above, according to the operation planning system 1 of this embodiment, the facility DB 11 further stores the maintenance basic unit information D15 indicating the environmental load caused by the maintenance work of the battery 23, and the basic unit determiner 142 adds, to the basic unit of the battery 23, the numeric value obtained by distributing the environmental load indicated by the maintenance basic unit information D15 to each charging/discharging cycle.

Accordingly, the environmental load caused by the maintenance work of the battery 23 can be also taken into consideration, and the environmental load of the battery 23 can be further examined. Therefore, a power plant having a little environmental load can be further precisely extracted, thereby reducing the environmental load.

(Seventh Embodiment)

An explanation will be given of an operation schedule planning method by an operation planning system according to a seventh embodiment. The detailed explanation for the same configuration as those of the first to sixth embodiments or a combination thereof will be omitted. This operation planning system calculates an environmental-load reduction quantity relative to an expected and existing operation schedule created by an existing operation planning system.

Figure 21:
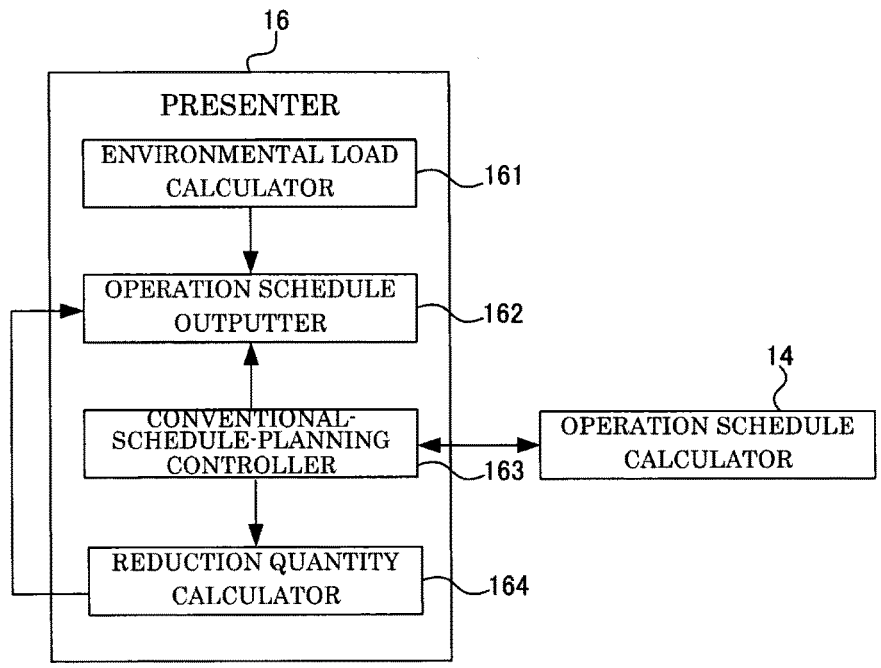
FIG. 21 is a block diagram illustrating a detailed configuration of a presenter according to a seventh embodiment.

FIG. 21 is a block diagram illustrating a detailed configuration of the presenter 16 of this embodiment. The presenter 16 includes an environmental-load calculator 161, an operation schedule outputter 162, a conventional-schedule-planning controller 163, and a reduction quantity calculator 164.

The environmental-load calculator 161 multiplies the power generation basic unit information of the power generation facility extracted by the adder 144 by the power-generation-quantity information, and totals respective multiplication results. The operation schedule outputter 162 outputs, to the display and a printer, the power generation facility to be operated, the power generation quantity, and the environmental load.

The conventional-schedule-planning controller 163 causes the operation schedule calculator 14 to create an operation schedule to be created by an expected and existing operation planning system. The power generation facilities contained in the operation schedule can be decided in accordance with, for example, the LCA evaluation condition by the Central Research Institute of Electric Power Industry or a CDM methodology. The conventional-schedule-planning controller 163 enters such a condition in the operation schedule calculator 14, and sets an operation schedule. In addition, the conventional-schedule-setting controller enters necessary information to calculate an environmental load, such as the efficiency of the power generation facility, the operating rate thereof, and an environmental load.

The reduction quantity calculator 164 obtains a difference between the environmental load based on an existing operation schedule created by the conventional-schedule-planning controller 163 and the environmental load calculated through the first to sixth embodiments, and causes the operation schedule outputter 162 to output such a difference value as a reduction quantity.

As explained above, the operation planning system 1 of this embodiment includes the presenter 16 which calculates the reduction quantity of the environmental load, and which presents the reduction quantity together with the operation schedule. Hence, the reduction goal can be easily set when setting an operation schedule, prompting a reduction of the environmental load.

(Eighth Embodiment)

An explanation will be given of an operation schedule planning method by an operation planning system of an eighth embodiment. The detailed explanation for the same configuration as those of the seventh embodiment will be omitted. This operation planning system calculates the reduction quantity of an environmental load relative to an expected operation schedule to be created by an existing operation planning system, and converts this reduction quantity into economical profit.

Figure 22:
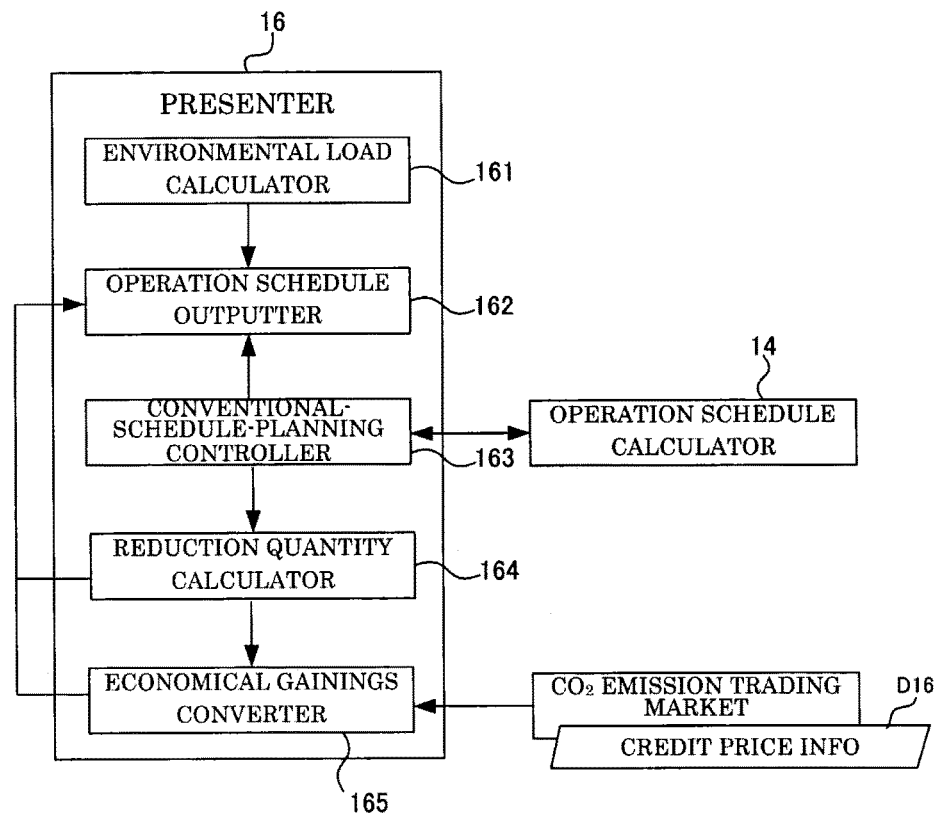
FIG. 22 is a block diagram illustrating a detailed configuration of a presenter according to an eighth embodiment.

FIG. 22 is a block diagram illustrating a detailed configuration of the presenter 16 of this embodiment. The presenter 16 further includes an economical profit converter 165. The economical profit converter 165 is connected to a $CO_2$ emission trading market through a communication network in a data exchangeable manner, and receives credit price information D16 of an environmental load. Next, the reduction quantity calculated by the reduction quantity calculator 164 is multiplied by the unit price indicated by the credit price information D16, and converts the reduction quantity into a profit. The conversion result is output by the operation schedule outputter 162.

As explained above, according to the operation planning system 1 of this embodiment, the presenter 16 converts the reduction quantity of the environmental load into credit price information, and presents the conversion result together with an operation schedule. Hence, a highly credible system in a $CO_2$ emission trading system can be constructed.

(Other Embodiments)

Several embodiments of the present disclosure were explained in this specification, but those embodiments are merely presented as examples, and are not intended to limit the scope and spirit of the present disclosure. More specifically, a combination of all of or a part of the first and second embodiments is also within the scope and spirit of the present disclosure. The above-explained embodiments can be carried out in various other forms, and permit various omissions, replacements, and modifications without departing from the scope and spirit of the present disclosure. Such embodiments and modifications thereof are within the scope and spirit of the present disclosure, and also within an equivalent range to the subject matter as recited in appended claims.

REFERENCE SIGNS LIST

C Central power-feeding instruction station
L Local power-feeding instruction station
Operation planning system
11 Facility DB
1 Facility-DB generator
13 Condition determiner
14 Operation schedule calculator
141 Power-generation-quantity determiner
142 Basic unit determiner
143 List creator
144 Adder
145 Section generator
146 Allowable quantity calculator
147 Operation limit quantity calculator
148 Determiner
149 Charging/discharging basic unit adder
150 Application determiner
151 Power generation basic unit adder
152 Manufacturing/disposing basic unit adder
153 Maintenance basic unit adder
16 Presenter
161 Environmental-load calculator
162 Operation schedule outputter
163 Conventional-schedule-planning controller
164 Reduction quantity calculator
165 Economical profit converter
2 Power grid network
21 Power plant
22 Transformer station
23 Battery
4 Operation planning DB
D1 Demand quantity information
D2 Power generation request
D3 Power generation basic unit information
D4 Battery-charge-level information
D5 Application information
D6 Charging/discharging basic unit information
D7 Power-generation-quantity information
D8 Average power generation basic unit information
D9 Depth limit information
D10 Installed environment information
D11 Operation constraint information
D12 Manufacturing/disposing basic unit information
D13 Lifetime-cycle-number information
D14 Recycle rate information
D15 Maintenance basic unit information
D16 Credit price information
D17 Individual-operation availability information

The invention claimed is:

1. An operation planning system formulating a power generation operation schedule for a power grid network in accordance with a power demand, the power grid network comprising a plurality of power plants, a plurality of transformer stations, and a plurality of batteries installed in association with the power plants and the transformer stations, the plurality of power plants, the plurality of transformer stations, and the plurality of batteries being connected together through a power system, the operation planning system comprising:
a database storing power generation basic unit information of the power plant, and derivation information on stored energy in the battery;
a basic unit determiner setting power generation basic unit information of the battery to which power generation basic unit of the stored energy is added based on the power generation basic unit information of the power plant and the derivation information of the stored energy; and
an adder that sequentially adds, while selecting a power generation facility from the power plants and the batteries in an order of a smaller value indicated by the power generation basic unit information, a power generation quantity of the selected power generation facility to a total power generation quantity until the total power generation quantity matches the demand quantity,
wherein the operation planning system formulates the operation schedule that presents the power generation facility and each power generation quantity in accordance with the demand quantity;
wherein the derivation information is application information indicating an application of the battery;
wherein the application information on the battery installed in association with the power plant indicates an application for a fluctuation suppression; and
when the application information indicates an application for a fluctuation suppression, the basic unit determiner adds the power generation basic unit information of the power plant where the battery is installed in association therewith to the power generation basic unit information of the battery associated with the application information.

2. The operation planning system according to claim 1, wherein;
the application information on the battery installed in association with the transformer station indicates an application for a load equalization; and
when the application information indicates an application for a load equalization, the basic unit determiner adds an average value of numeric values indicated by the power generation basic unit information on the respective power plants in the power grid network to the power generation basic unit information of the battery associated with the application information.

3. The operation planning system according to claim 1, further comprising:
a section generator that generates section information associating the power generation facilities to be operated in a linked manner with each other; and
a power-generation-quantity determiner that totals the power generation quantities of the respective power generation facilities in the section information to set the net power generation quantity of the section,
wherein:
the basic unit determiner calculates a basic unit of the section based on the power generation quantity of each power generation facility in the section information and a basic unit thereof; and
the adder adds, while selecting the section in an order of a smaller value indicated by the power generation basic unit information, the power generation quantity of the selected section to the total power generation quantity until the total power generation quantity matches the demand quantity.

4. The operation planning system according to claim 1, further comprising a power-generation-quantity determiner that sets a discharging quantity of the battery,
wherein the power-generation-quantity determiner comprises:
an allowable quantity calculator calculating an allowable discharging quantity obtained by subtracting the lower limit constraint value of a remaining battery charge from the charging quantity of the battery;
an operation limit quantity calculator calculating a discharging operation limit quantity based on a limit of a discharging speed of the battery on a basis of an installed environment of the battery; and
a determiner comparing the allowable discharging quantity with the discharging operation limit quantity to set either one of the allowable discharging quantity and the discharging operation limit quantity as the discharging quantity of the battery.

5. The operation planning system according to claim 1, wherein:
the database further stores charging/discharging basic unit information indicating an environmental load of a charging/discharging loss by the battery; and
the basic unit determiner adds a numeric value indicated by the charging/discharging basic unit information to the power generation basic unit of the battery.

6. The operation planning system according to claim 1, wherein:
the database further stores manufacturing/disposing basic unit information indicating an environmental load caused by manufacturing and disposing processes of the battery; and
the basic unit determiner adds, to the basic unit of the battery, a value obtained by distributing the environmental load indicated by the manufacturing/disposing basic unit information to each charging/discharging cycle.

7. The operation planning system according to claim 6, wherein:
the database further stores recycle rate information indicating a rate of an environmental load of reusable parts of the battery; and
the basic unit determiner multiplies the manufacturing/disposing basic unit information by the rate indicated by the recycle rate information, and adds, to the basic unit of the battery, a value obtained by distributing a multiplication result to each charging/discharging cycle.

8. The operation planning system according to claim 1, wherein:
the database further stores maintenance basic unit information indicating an environmental load caused by a maintenance work for the battery; and
the basic unit determiner adds, to the basic unit of the battery, a value obtained by distributing the environmental load indicated by the maintenance basic unit information to each charging/discharging cycle.

9. The operation planning system according to claim 6, wherein the basic unit determiner:
stores, for each discharging lower limit depth of the battery, information indicating a number of cycles until the battery reaches a lifetime; and calculates a number of cycles until the battery reaches the lifetime based on the information indicating the discharging lower limit depth of the battery.

10. The operation planning system according to claim 1, further comprising a presenter calculating a reduction quantity of an environmental load and presenting the reduction quantity together with the operation schedule.

11. The operation planning system according to claim 10, wherein the presenter converts the reduction quantity into credit price information, and presents the credit price information together with the operation schedule.

12. The operation planning system according to claim 1, provided in a local power-feeding instruction station connected to the power grid network and a central power-feeding instruction station.

* * * * *